United States Patent
Tadano et al.

(10) Patent No.: US 11,449,039 B2
(45) Date of Patent: Sep. 20, 2022

(54) TRANSPORTATION OPERATION CONTROL DEVICE, TRANSPORTATION OPERATION CONTROL METHOD, AND RECORDING MEDIUM IN WHICH TRANSPORTATION OPERATION CONTROL PROGRAM IS STORED

(71) Applicant: NEC Corporation, Tokyo (JP)

(72) Inventors: Kumiko Tadano, Tokyo (JP); Yoshiharu Maeno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 250 days.

(21) Appl. No.: 16/753,842

(22) PCT Filed: Oct. 16, 2017

(86) PCT No.: PCT/JP2017/037402
§ 371 (c)(1),
(2) Date: Apr. 6, 2020

(87) PCT Pub. No.: WO2019/077658
PCT Pub. Date: Apr. 25, 2019

(65) Prior Publication Data
US 2020/0293028 A1    Sep. 17, 2020

(51) Int. Cl.
G05B 19/418    (2006.01)
(52) U.S. Cl.
CPC ............... G05B 19/41865 (2013.01); G05B 2219/50397 (2013.01)
(58) Field of Classification Search
None
See application file for complete search history.

(56) References Cited

U.S. PATENT DOCUMENTS 5,712,789 A * 1/1998 Radican ............. G06Q 10/0875
705/28
5,880,958 A * 3/1999 Helms ................. G08G 1/202
340/991

(Continued)

FOREIGN PATENT DOCUMENTS

JP    S60-213613 A    10/1985
JP    S62-24311 A    2/1987

(Continued)

OTHER PUBLICATIONS

International Search Report for PCT Application No. PCT/JP2017/037402, dated Nov. 21, 2017.

(Continued)

*Primary Examiner* — Jason Lin
(74) *Attorney, Agent, or Firm* — Sughrue Mion, PLLC

(57) ABSTRACT

This transportation operation control device includes: an acquisition unit that acquires presence status information of an article; an influence degree calculation unit that calculates, by employing a calculation criterion, the magnitude of the degree of influence on a transportation source site by a pre-process site that influences the transportation source site based on the presence status information related to the transportation source site and the pre-process site; an importance degree calculation unit that calculates the importance degree of a transportation operation from the transportation source site to a transportation destination site based on a transportation cost required for the transportation operation, the presence status information, and the magnitude of the degree of influence; and an updating unit that updates the calculation criterion based on the presence status information after the execution of the transportation operation selected based on the importance degree.

20 Claims, 12 Drawing Sheets

(56) References Cited

U.S. PATENT DOCUMENTS

| | | | | |
|---|---|---|---|---|
| 6,401,078 | B1 * | 6/2002 | Roberts | G06Q 10/10 |
| | | | | 705/28 |
| 6,411,891 | B1 * | 6/2002 | Jones | G06Q 10/08 |
| | | | | 455/12.1 |
| 6,611,732 | B2 * | 8/2003 | Okamura | G06Q 10/08 |
| | | | | 700/226 |
| 6,892,131 | B2 * | 5/2005 | Coffee | H04W 56/0085 |
| | | | | 455/518 |
| 7,392,198 | B2 * | 6/2008 | Hoffmann | G06Q 10/0833 |
| | | | | 700/229 |
| 7,405,655 | B2 * | 7/2008 | Ng | G08G 1/207 |
| | | | | 340/568.1 |
| 7,508,956 | B2 * | 3/2009 | Scheppmann | G06T 7/292 |
| | | | | 348/148 |
| 8,019,468 | B2 * | 9/2011 | Hayashi | G06Q 10/08 |
| | | | | 700/121 |
| 8,121,724 | B2 * | 2/2012 | Hayashi | G06Q 10/06 |
| | | | | 700/228 |
| 8,521,406 | B2 * | 8/2013 | Harasaki | G05D 1/0289 |
| | | | | 198/348 |
| 8,627,942 | B2 * | 1/2014 | Terazawa | B62D 65/18 |
| | | | | 198/465.1 |
| 8,843,403 | B2 * | 9/2014 | Laub | G06Q 10/087 |
| | | | | 705/28 |
| 2014/0163721 | A1 | 6/2014 | Ogawa et al. | |

FOREIGN PATENT DOCUMENTS

| | | |
|---|---|---|
| JP | H03-231313 A | 10/1991 |
| JP | H05-267431 A | 10/1993 |
| JP | 2000-269305 A | 9/2000 |
| WO | 2012/147261 A1 | 11/2012 |

OTHER PUBLICATIONS

English translation of Written opinion for PCT Application No. PCT/JP2017/037402.

* cited by examiner

Fig. 4

161 WS LINK MANAGEMENT TABLE

| LINK IDENTIFIER | TRANSPORTATION SOURCE WS IDENTIFIER | TRANSPORTATION DESTINATION WS IDENTIFIER |
|---|---|---|
| x1y1 | $WS_{x1}$ | $WS_{y1}$ |
| x1y2 | $WS_{x1}$ | $WS_{y2}$ |
| x1y3 | $WS_{x1}$ | $WS_{y3}$ |
| x2y1 | $WS_{x2}$ | $WS_{y1}$ |
| x2y2 | $WS_{x2}$ | $WS_{y2}$ |
| x2y3 | $WS_{x2}$ | $WS_{y3}$ |
| y1z1 | $WS_{y1}$ | $WS_{z1}$ |
| y2z1 | $WS_{y2}$ | $WS_{z1}$ |
| y3z1 | $WS_{y3}$ | $WS_{z1}$ |

Fig. 5

162 TRANSPORTATION COST IDENTIFIER MANAGEMENT TABLE

| TRANSPORTATION COST IDENTIFIER | TRANSPORTATION SOURCE WS IDENTIFIER | TRANSPORTATION DESTINATION WS IDENTIFIER | NOTE |
|---|---|---|---|
| $C_{x1x1}$ | $WS_{x1}$ | $WS_{x1}$ | COST FOR MOVEMENT FROM INPUT BUFFER OF $WS_{x1}$ TO OUTPUT BUFFER OF $WS_{x1}$ |
| $C_{x1x2}$ | $WS_{x1}$ | $WS_{x2}$ | COST FOR MOVEMENT FROM INPUT BUFFER OF $WS_{x1}$ TO OUTPUT BUFFER OF $WS_{x2}$ |
| $C_{x1y1}$ | $WS_{x1}$ | $WS_{y1}$ | COST FOR MOVEMENT FROM INPUT BUFFER OF $WS_{x1}$ TO OUTPUT BUFFER OF $WS_{y1}$ |
| $C_{x1y2}$ | $WS_{x1}$ | $WS_{y2}$ | COST FOR MOVEMENT FROM INPUT BUFFER OF $WS_{x1}$ TO OUTPUT BUFFER OF $WS_{y2}$ |
| $C_{x1y3}$ | $WS_{x1}$ | $WS_{y3}$ | COST FOR MOVEMENT FROM INPUT BUFFER OF $WS_{x1}$ TO OUTPUT BUFFER OF $WS_{y3}$ |

Fig. 6

TRANSPORTATION COST MANAGEMENT TABLE

| TRANSPORTATION COST IDENTIFIER | TRANSPORTATION COST |
|---|---|
| $C_{x1x1}$ | 1 |
| $C_{x1x2}$ | 2 |
| $C_{x1y1}$ | 4 |
| $C_{x1y2}$ | 3 |
| $C_{x1y3}$ | 2 |
| ⋮ | ⋮ |

Fig. 7

165 BUFFER MANAGEMENT TABLE

| BUFFER IDENTIFIER | BUFFER USAGE RATE |
|---|---|
| $I_{x1}$ | 80 |
| $O_{x1}$ | 100 |
| $I_{x2}$ | 80 |
| $O_{x2}$ | 100 |
| $I_{y1}$ | 90 |
| $O_{y1}$ | 80 |
| $I_{y2}$ | 90 |
| $O_{y2}$ | 70 |
| $I_{y3}$ | 90 |
| $O_{y3}$ | 60 |
| $I_{z1}$ | 50 |
| $O_{z1}$ | 10 |

Fig. 8

164 CALCULATION CRITERION MANAGEMENT TABLE

| WEIGHTING COEFFICIENT OF DEGREE OF INFLUENCE | VALUE |
|---|---|
| $\alpha_{y1}$ | 1 |
| $\alpha_{y2}$ | 1 |
| $\alpha_{y3}$ | 1 |

Fig. 9

166 IMPORTANCE DEGREE MANAGEMENT TABLE

| LINK IDENTIFIER | CALCULATION FORMULA | IMPORTANCE DEGREE OF TRANSPORTATION OPERATION |
|---|---|---|
| x1y1 | $\dfrac{O_{x1} - I_{y1}}{C_{x1x1}} = \dfrac{100 - 90}{1}$ | 10 |
| x1y2 | $\dfrac{O_{x1} - I_{y2}}{C_{x1x1}} = \dfrac{100 - 90}{1}$ | 10 |
| x1y3 | $\dfrac{O_{x1} - I_{y3}}{C_{x1x1}} = \dfrac{100 - 90}{1}$ | 10 |
| x2y1 | $\dfrac{O_{x2} - I_{y1}}{C_{x1x2}} = \dfrac{100 - 90}{2}$ | 5 |
| x2y2 | $\dfrac{O_{x2} - I_{y2}}{C_{x1x2}} = \dfrac{100 - 90}{2}$ | 5 |
| x2y3 | $\dfrac{O_{x2} - I_{y3}}{C_{x1x2}} = \dfrac{100 - 90}{2}$ | 5 |
| y1z1 | $\dfrac{O_{y1} - I_{z1} + a_{y1} \sum_{i=1}^{2}(O_{xi} - I_{y1})}{C_{x1y1}} = \dfrac{80 - 50 + 1 \times (100 - 90 + 100 - 90)}{4}$ | 12.5 |
| y2z1 | $\dfrac{O_{y2} - I_{z1} + a_{y2} \sum_{i=1}^{2}(O_{xi} - I_{y2})}{C_{x1y2}} = \dfrac{70 - 50 + 1 \times (100 - 90 + 100 - 90)}{3}$ | 13.3 |
| y3z1 | $\dfrac{O_{y3} - I_{z1} + a_{y3} \sum_{i=1}^{2}(O_{xi} - I_{y3})}{C_{x1y3}} = \dfrac{60 - 50 + 1 \times (100 - 90 + 100 - 90)}{2}$ | 15 ← IMPORTANCE DEGREE IS GREATEST |

TRANSPORTATION OPERATION CONTROL DEVICE, TRANSPORTATION OPERATION CONTROL METHOD, AND RECORDING MEDIUM IN WHICH TRANSPORTATION OPERATION CONTROL PROGRAM IS STORED

This application is a National Stage Entry of PCT/JP2017/037402 filed on Oct. 16, 2017, the contents of all of which are incorporated herein by reference, in their entirety.

TECHNICAL FIELD

The present invention relates to a technology for, with respect to a series of production operations and the like including a plurality of operations (work processes) that are performed in a factory or the like, controlling transportation of articles among sites where the operations are performed.

BACKGROUND ART

A structure that achieves a series of production operations including a plurality of operations (work processes) that are performed in a factory or the like can be considered as a set of a plurality of sites (in the present application, hereinafter, referred to as workstations (WSs)) where processing, such as production and inspection, is performed. An actual workstation is, for example, a work cell or a facility (shop) that is constituted by grouping machines (apparatuses) or the like each of which has a specific function.

A workstation is in general constituted by an input buffer, a processing unit, and an output buffer. The processing unit has a function (constituent element) of performing one of production, inspection, packing, and the like. The input buffer and the output buffer have a function of storing an inventory of articles (work-in-processes, parts, products, and the like).

The workstation performs a series of operations, such as production and inspection, on articles stored in the input buffer and stores processed articles in the output buffer. A transportation operator, a transportation device (transportation vehicle), or the like takes out an article from the output buffer of a workstation to serve as a transportation origin and transports the article to the input buffer of a workstation to serve as a transportation destination. The transportation operator or the transportation device stores the article in the input buffer of the transportation destination workstation.

On this occasion, when, for example, the speed of transportation of articles is too fast or too slow, a spatial lack of balance relating to articles stored in buffers (that is, an imbalance in usage rates between the output buffer of a workstation to serve as a transportation origin and the input buffer of a workstation to serve as a transportation destination) occurs. The imbalance means an inappropriate difference or an inappropriate ratio relating to usage rates of both buffers or a usage rate of at least one of the buffers being equal to or greater than a threshold value or equal to or less than a threshold value. In the present application, hereinafter, such an event is referred to as imbalance of buffers.

When an imbalance of buffers occurs, there is a possibility that a load concentrates locally on a specific operation process (work process) or transportation operation. Alternatively, conversely to the above, there is a possibility that, in such a case, useless waiting time occurs to a transportation operator, a transportation device, a production operator, a production device, or the like to which an operation has been allocated or rearrangement of such operators and devices becomes necessary. Because of this possibility, there is a possibility that efficient, stable production and transportation in the entire factory or warehouse are inhibited. Therefore, expectations have been rising for a technology capable of controlling transportation operations between buffers in such a way as to, in an environment in which transportation resources (transportation operators, transportation vehicles, or the like) are limited, appropriately reduce buffer imbalance between workstations in order to improve processing capability in the entire factory or warehouse.

As a technology related to such an expected technology, PTL 1 discloses that an article containing system that contains, into a container having identification information, a plurality of types of articles associated with the container and carries out the container. The system includes a storage shelf for temporarily storing a plurality of carried-in containers. The system includes a plurality of container arrangement means in each of which a carrying-in unit that accepts a container, a containing unit at which an article is contained into the container by an operator, and a carrying-out unit at which the container in which the article is contained is discharged are joined by means of a conveyor. The system transfers any container between the storage shelf and the carrying-in unit and carrying-out unit of any container arrangement means. The system notifies individual containing information that is information relating to articles that are arranged to container arrangement means and are to be contained in a container and is associated with identification information. The system transfers a container having identification information associated with notified individual containing information to container arranging means associated with the container.

PTL 2 discloses a device that controls transportation sequences of articles to be processed. It is assumed that test pieces X for a process A and test pieces Y for a process B, which are to be transported by the device, are stored in a warehouse. When a load on the process A is greater than a load on the process B and requests for transportation of test pieces are issued from the processes A and B at the same time, the device determines to preferentially transport a test piece X to the process A where a load is greater and, after the transportation of the test piece X has been finished, transport a test piece Y to the process B.

PTL 3 discloses a transportation control method in which upstream side facilities and downstream side facilities are linked by a transportation line and each slab is transported by way of a transportation route linking one facility among the upstream side facilities and one facility among the downstream side facilities. In the method, evaluation items and weighting coefficients thereof for, when a slab is carried out from a facility among the upstream side facilities and carried in into a facility among the downstream side facilities, evaluating a degree of influence exerted by the carrying-out and carrying-in on logistics efficiency are determined in advance. In the method, immediately before a slab is carried out from one facility among the upstream side facilities, evaluation scores based on the evaluation items and the weighting coefficients thereof are calculated with respect to all possible transportation routes, and the slab is transported by way of a transportation route the evaluation score of which is the highest.

CITATION LIST

Patent Literature

[PTL 1] WO 2012/147261 A
[PTL 2] JP 2000-269305 A
[PTL 3] JP 60-213613 A

SUMMARY OF INVENTION

Technical Problem

In a general factory, warehouse, or the like, transportation capability and a transportation load relating to the above-described transportation operations between workstations dynamically change because of various factors. Factors causing transportation capability and a transportation load to dynamically change include, for example, the followings.

Since transportation operation is dependent on individual skills, transportation capability of operators changes depending on, for example, degrees of proficiency of the operators, combinations of the operators belonging to operation teams, or degrees of fatigue of the operators (for example, the degree of concentration on an operation decreases as time elapses from the start of the operation).

In a factory in which types of products and the amount of production of the products frequently change or a warehouse in which a large number of types of articles are stored, details of transportation operation (the types and amount of products, transportation methods, transportation routes, degrees of interference on transportation routes, competition between transportation resources, and the like) frequently change.

Instability in the amount of articles accumulating in the buffers of workstations causes transportation loads to change frequently and substantially. Examples of this case include a case where, because of frequent production of new products or efforts required for or inexperience in changes in processes in response to fluctuation in demand, fluctuation relating to processing speed of the processes occurs. Alternatively, such examples include a case where production is performed in an environment in which apparatuses are forced to be suspended frequently because safety margin is set to be inappropriately large for the purpose of quality assurance or a case where unpredictable suspension is likely to occur due to use of an apparatus the availability of which is low.

In such an environment in which transportation capability and a transportation load relating to transportation operation dynamically change, there is a possibility that processing efficiency in the entire factory or warehouse is substantially reduced due to a workstation positioned on the downstream side (the succeeding process side) being substantially influenced by a workstation positioned on the upstream side (the pre-process side) in the operation process.

For example, a case where detection of a state in which a sudden increase in the number of articles processed by a workstation on the upstream side substantially influences a workstation on the downstream side is delayed is considered. In this case, overflow of articles at the input buffer and the like of the workstation on the downstream side may cause stable, efficient production processing and transportation processing in the entire factory or warehouse to be inhibited. Alternatively, conversely to the above case, when the number of articles processed by a workstation on the upstream side has suddenly decreased, a surplus may be caused to occur in transportation resources having been allocated to a transportation operation of transporting articles to a workstation on the downstream side. That is, in this case, inappropriate allocation of the transportation resources may cause efficient production processing and transportation processing in the entire factory or warehouse to be inhibited. When the transportation resources are rearranged in order to cope with such a fluctuation, a new cost is incurred.

Therefore, the inventors have found that it is a problem to be solved to, in an environment in which transportation capability and a transportation load relating to transportation operation dynamically change, avoid a substantial reduction in processing efficiency in the entire factory or warehouse due to a workstation positioned on the downstream side being substantially influenced by fluctuation relating to a workstation positioned on the upstream side in the operation process. PTLs 1 to 3 fail to mention about the problem. A principal object of the present invention is to provide transportation operation control and the like that solves the problem.

Solution to Problem

A transportation operation control device according to one aspect of the present invention includes an acquisition means for acquiring presence status information representing presence statuses of articles at a plurality of sites, an influence degree calculation means for calculating a magnitude of a degree of influence of the pre-process site on the transportation source site, using a calculation criterion, based on the presence status information relating to the transportation source site and the pre-process site among the plurality of sites, the pre-process site influencing the presence status of articles at the transportation source site, an importance degree calculation means for calculating a importance degree of the transportation operation for a combination of the transportation source site and the transportation destination site, based on a transportation cost required for a transportation operation of transporting the article from the transportation source site to a transportation destination site among the plurality of sites, the presence status information relating to the transportation source site and the transportation destination site, and the magnitude of the degrees of influence, and an updating means for updating the calculation criterion, based on the presence status information relating to the transportation source site and the transportation destination site after the transportation operation selected based on the importance degree has been performed.

In another aspect of achieving the above-described object, a transportation operation control method according to one aspect of the present invention includes an information processing device performing acquiring presence status information representing presence statuses of articles at a plurality of sites, calculating a magnitude of a degree of influence of a pre-process site on a transportation source site, using a calculation criterion, based on the presence status information relating to the transportation source site and the pre-process site among the plurality of sites, the pre-process site influencing the presence status of articles at the transportation source site, calculating a importance degree of the transportation operation for a combination of the transportation source site and the transportation destination site, based on a transportation cost required for a transportation operation of transporting the article from the transportation source site to a transportation destination site among the plurality of sites, the presence status information relating to the transportation source site and the transportation destination site, and the magnitude of the degrees of influence, and updating the calculation criterion, based on the presence status information relating to the transportation source site and the transportation destination site after the transportation operation selected based on the importance degree has been performed.

In still another aspect of achieving the above-described object, a transportation operation control program according to one aspect of the present invention is a program causing a computer to execute acquisition processing of acquiring presence status information representing presence statuses of articles at a plurality of sites, influence degree calculation processing of calculating a magnitude of a degree of influence of a pre-process site on a transportation source site, using a calculation criterion, based on the presence status information relating to the transportation source site and the pre-process site among the plurality of sites, the pre-process site influencing the presence status of articles at the transportation source site, importance degree calculation processing of calculating a importance degree of the transportation operation for a combination of the transportation source site and the transportation destination site, based on a transportation cost required for a transportation operation of transporting the article from the transportation source site to a transportation destination site among the plurality of sites, the presence status information relating to the transportation source site and the transportation destination site, and the magnitude of the degrees of influence, and updating processing of updating the calculation criterion, based on presence status information relating to the transportation source site and the transportation destination site after the transportation operation selected based on the importance degree has been performed.

Further, the present invention can also be achieved by a computer-readable nonvolatile recording medium in which the above-described transportation operation control program (computer program) is stored.

Advantageous Effects of Invention

The present invention enables, when, in a factory or the like, loads on operation processes and transportation capability for articles change, a sure performance of transportation control of the articles that avoids a reduction in processing efficiency in the entire factory caused by a downstream side process being influenced by fluctuations in an upstream side process.

BRIEF DESCRIPTION OF DRAWINGS

FIG. 4 is a diagram exemplifying a configuration of a WS link management table 161 according to the first example embodiment of the present invention;

FIG. 5 is a diagram exemplifying a configuration of a transportation cost identifier management table 162 according to the first example embodiment of the present invention;

FIG. 6 is a diagram exemplifying a configuration of a transportation cost management table 163 according to the first example embodiment of the present invention;

FIG. 7 is a diagram exemplifying a configuration of a buffer management table 165 according to the first example embodiment of the present invention;

FIG. 8 is a diagram exemplifying a configuration of a calculation criterion management table 164 according to the first example embodiment of the present invention;

FIG. 9 is a diagram exemplifying a configuration of an importance degree management table 166 according to the first example embodiment of the present invention;

EXAMPLE EMBODIMENT

Hereinafter, example embodiments of the present invention will be described in detail with reference to the drawings.

First Example Embodiment

Figure 1:
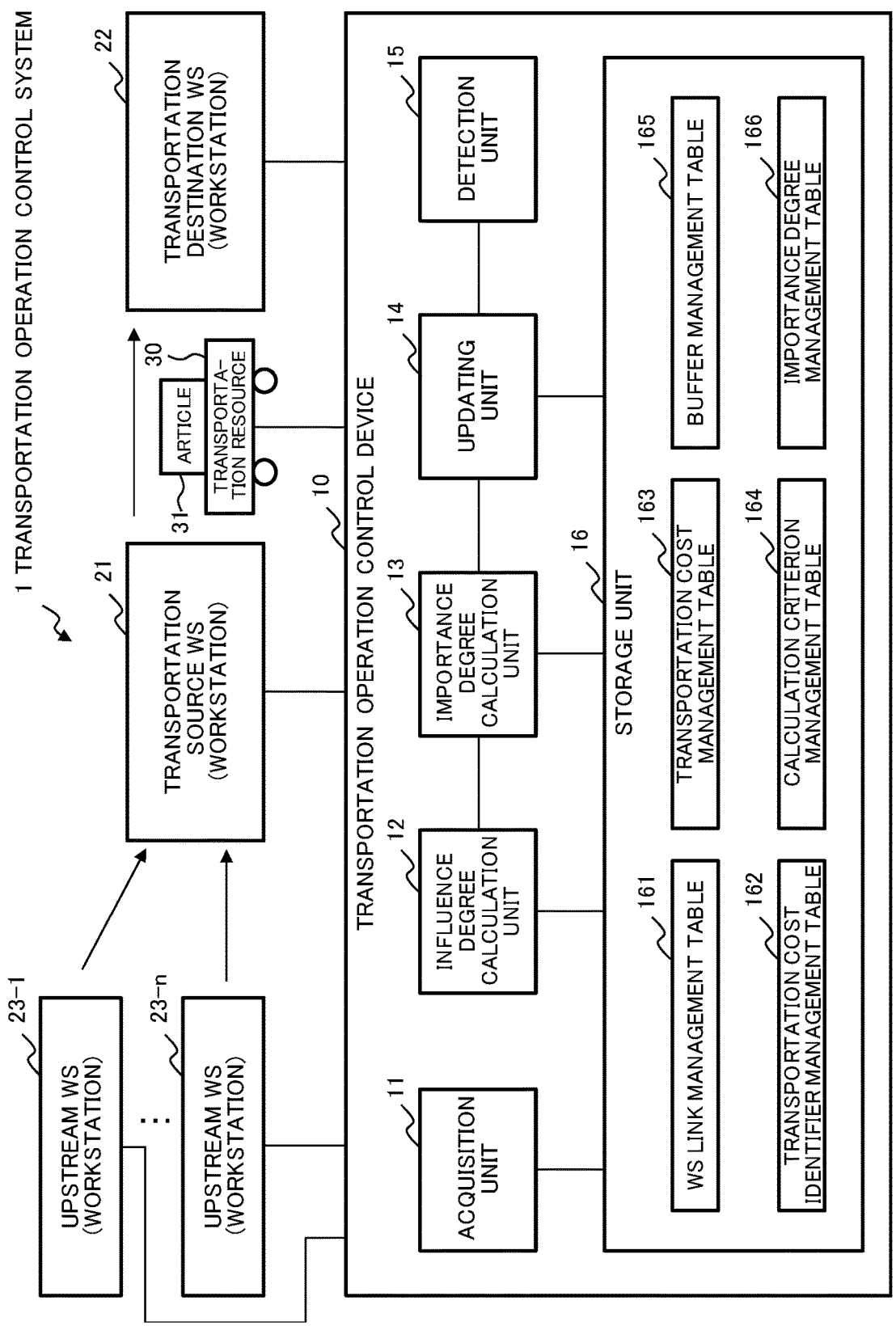
FIG. 1 is a block diagram illustrating a configuration of a transportation operation control system 1 according to a first example embodiment of the present invention.

FIG. 1 is a block diagram conceptually illustrating a configuration of a transportation operation control system 1 according to a first example embodiment of the present invention. The transportation operation control system 1 according to the present example embodiment is a system that, with respect to production operations and the like that are performed in a factory or the like and that include a plurality of operations (work processes), controls transportation of articles among sites (workstations (WSs)) that perform the operations. A WS is, for example, an operation cell or a shop that is constituted by grouping apparatuses each of which has a specific function.

The transportation operation control system 1 includes, when roughly divided, a transportation operation control device 10 and a transportation resource 30. The transportation resource 30 is connected to the transportation operation control device 10 in a communicable manner and, controlled by the transportation operation control device 10, transports an article 31 from a transportation source WS 21 to a transportation destination WS 22. The transportation resource 30 is, for example, a transportation device, such as a transportation vehicle, that is capable of transporting the article 31.

When, for example, an operator performs a transportation operation while on board a transportation vehicle, the transportation resource 30 is the transportation vehicle, and the transportation vehicle presents, to the operator, information indicating details of the transportation operation received from the transportation operation control device 10, using an image, a sound, or the like. When an operator performs transportation without using a transportation vehicle, the transportation resource 30 is equivalent to the operator and a terminal device that presents information indicating a transportation operation to the operator. When an unmanned automatic transportation vehicle performs a transportation operation, the transportation resource 30 is the unmanned automatic transportation vehicle, and the unmanned automatic transportation vehicle performs the transportation operation in accordance with information indicating details of the transportation operation received from the transportation operation control device 10. The information indicating details of a transportation operation transmitted from the transportation operation control device 10 may be displayed on a display device or the like installed on the transportation source WS 21 and the transportation destination WS 22.

The transportation source WS 21, the transportation destination WS 22, and upstream (pre-process) WSs 23-1 to 23-$n$ ($n$ is any natural number) are workstations that perform processing, such as production and inspection. In the present application, hereinafter, the upstream WSs 23-1 to 23-$n$ are sometimes collectively referred to as upstream WSs 23. The upstream WSs 23 are workstations that perform operation processes that are positioned more upstream (on the pre-process side) than an operation process performed by the transportation source WS 21. Therefore, the article 31 that the transportation source WS 21 processes is transported from one of the upstream WSs 23. That is, the upstream WSs 23 are workstations that influence the transportation source WS 21 with respect to a presence status of the article 31.

Figure 2:
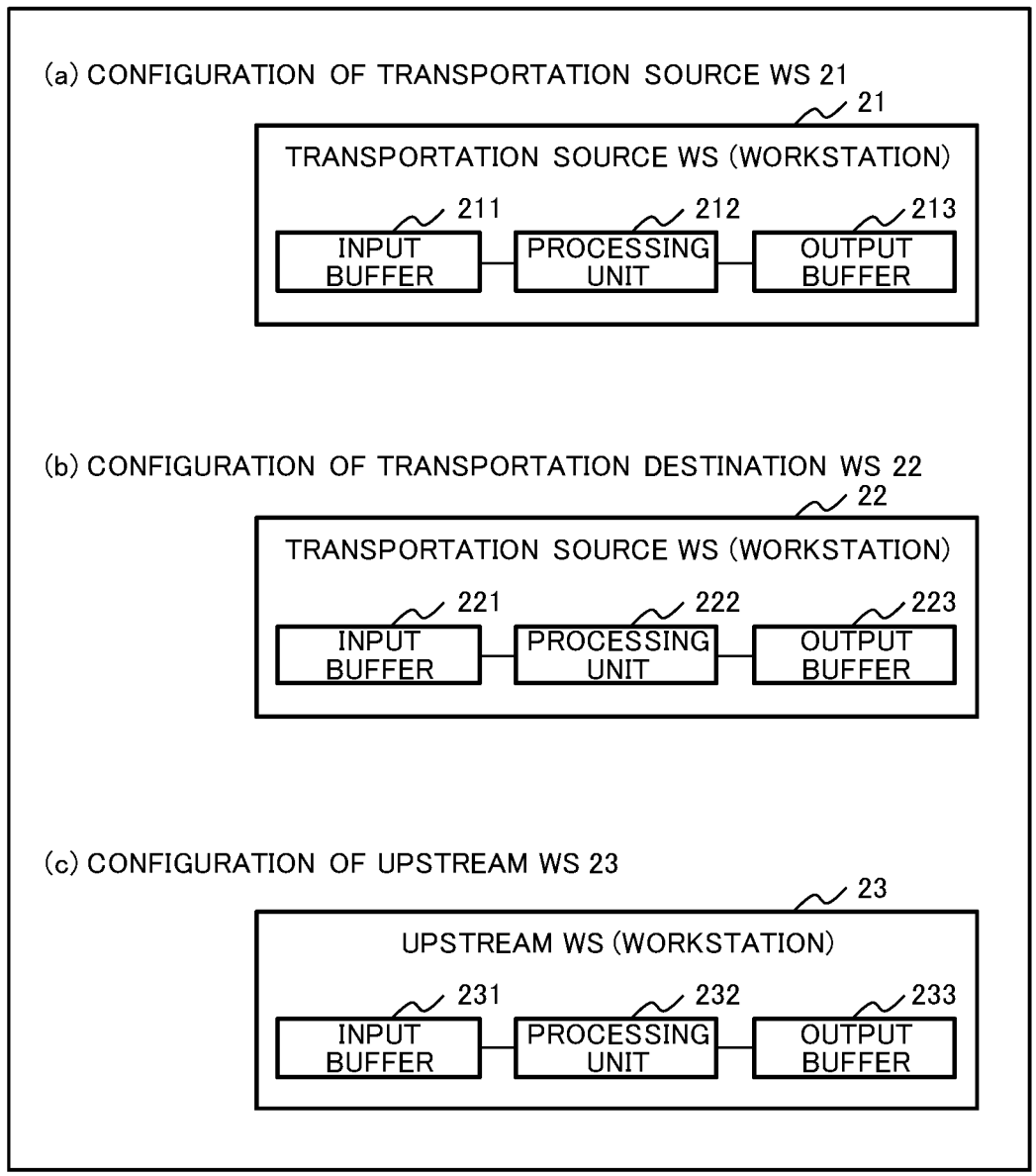
FIG. 2 is block diagrams illustrating configurations of workstations according to the first example embodiment of the present invention.

FIG. 2 is block diagrams conceptually illustrating configurations of workstations according to the present example embodiment. As illustrated in FIG. 2 ($a$), the transportation source WS 21 includes an input buffer 211, a processing unit 212, and an output buffer 213. As illustrated in FIG. 2 ($b$), the transportation destination WS 22 includes an input buffer 221, a processing unit 222, and an output buffer 223. As illustrated in FIG. 2 ($c$), an upstream WS 23 includes an input buffer 231, a processing unit 232, and an output buffer 233. However, it is assumed that all the upstream WSs 23-1 to 23-$n$, illustrated in FIG. 1, have the configuration illustrated in FIG. 2 ($c$).

Each of the processing units 212, 222, and 232 has a function of performing an operation (work process), such as production, inspection, and packing, on an article 31. Each of the processing units 212, 222, and 232 can be achieved by at least either an apparatus or an operator. Each of the input buffers 211, 221, and 231 has a function of storing an article 31 that is in a state of waiting for being processed by the processing unit 212, 222, or 232 in the transportation source WS 21, the transportation destination WS 22, or one of the upstream WSs 23. Each of the output buffers 213, 223, and 233 has a function of storing an article 31 that is in a state of, after having been processed by the processing unit 212, 222, or 232, waiting for being transported by the transportation resource 30 in the transportation source WS 21, the transportation destination WS 22, or one of the upstream WSs 23.

Although, in FIG. 1, for convenience of description, one transportation source WS 21, one transportation destination WS 22, and one transportation resource 30 are illustrated, it is assumed that the transportation operation control system 1 according to the present example embodiment includes a large number of workstations as transportation source WSs 21 or transportation destination WSs 22 and has a large number of combinations of a transportation source WS 21 and a transportation destination WS 22. With respect to each of the large number of transportation source WSs 21, upstream WSs 23 that supply the transportation source WS 21 with articles 31 exist. The transportation operation control system 1 may also include a plurality of transportation resources 30 that transport articles 31 in parallel between workstations included in such combinations of workstations.

The transportation operation control device 10 of the present example embodiment controls transportation operations in each of which an article 31 is transported from a transportation source WS 21 to a transportation destination WS 22 by a transportation resource 30. The transportation operation control device 10 is capable of controlling the plurality of transportation resources 30 that transport articles 31 in parallel among the large number of workstations.

The transportation operation control device 10 includes an acquisition unit 11, an influence degree calculation unit 12, an importance degree calculation unit 13, an updating unit 14, a detection unit 15, and a storage unit 16.

The storage unit 16 is a storage device, such as a magnetic disk and an electronic memory. The storage unit 16 stores a WS link management table 161, a transportation cost identifier management table 162, a transportation cost management table 163, a calculation criterion management table 164, a buffer management table 165, and an importance degree management table 166. Details of the information stored in the storage unit 16 will be described later.

The acquisition unit 11 acquires information indicating a presence status (presence status information) relating to articles 31 in the input buffer 211 and the output buffer 213 from each transportation source WS 21. The acquisition unit 11 acquires presence status information relating to articles 31 in the input buffer 221 and the output buffer 223 from each transportation destination WS 22. The acquisition unit 11 acquires presence status information relating to articles 31 in the input buffer 231 and the output buffer 233 from each upstream WS 23. The presence status information is, for example, the amount (number, weight, or the like) of buffer used by articles 31 stored in each buffer. Alternatively, the presence status information is a usage rate of each buffer (a ratio of the amount of buffer used to the maximum amount of articles 31 that can be stored in the buffer (buffer capacity)). Still alternatively, the presence status information may be information representing a difference between a buffer capacity and the amount of buffer used, a ratio of the amount of buffer used to a predetermined criterion value, or the like.

Buffers with respect to which the acquisition unit 11 acquires presence status information may be the buffers of all the workstations or the buffers of some workstations in the transportation operation control system 1. The acquisition unit 11 may set, for example, the buffers of workstations that perform operations on a specific article 31, the buffers of workstations that have small buffer capacities, or the buffers of workstations in which variation (fluctuation) relating to processing capacity is large as buffers with respect to which the acquisition unit 11 acquires presence status information.

It is assumed that each transportation source WS 21, each transportation destination WS 22, and each upstream WS 23 have a function of generating the above-described presence status information and transmitting the generated presence status information to the transportation operation control device 10. In this case, each transportation source WS 21, each transportation destination WS 22, and each upstream WS 23 generate presence status information by using, for example, radio frequency identifications (RFIDs) stuck on articles 31, image recognition using a camera, or a weight scale. Alternatively, each transportation source WS 21, each transportation destination WS 22, and each upstream WS 23 may generate presence status information through input operations by operators. Examples of a method for the input operation include a method in which an operator reads a specific barcode stuck on an article 31, using a mobile terminal or the like every time the operator stores or takes out an article 31 in or from a buffer and transmits the read barcode from the mobile terminal to the acquisition unit 11. The acquisition unit 11 may have a function of generating presence status information.

The influence degree calculation unit 12 calculates, based on imbalances between the amounts of buffer used (first amounts) or usage rates (first usage rates) of the output buffers 233 of upstream WSs 23 and the amount of buffer used (a second amount) or a usage rate (a second usage rate) of the input buffer 21 of each transportation source WS 21, the magnitude of a degree of influence of the upstream WSs 23 on the transportation source WS 21 relating to transportation operations (potential transportation operations that may be performed in the future).

That is, the larger the first amounts are or the smaller the second amount is, the greater the influence degree calculation unit 12 calculates the degree of influence to be. Alternatively, the larger the first usage rates are or the smaller the second usage rate is, the greater the influence degree calculation unit 12 calculates the degree of influence to be. Still alternatively, the larger are differences between the first amounts and the second amount or the larger are differences between the first usage rates and the second usage rate, the greater the influence degree calculation unit 12 calculates the degree of influence to be. Still alternatively, the larger are ratios of the first amounts to the second amount or the larger are ratios of the first usage rates to the second usage rate, the greater the influence degree calculation unit 12 calculates the degree of influence to be. On this occasion, the influence degree calculation unit 12 may weight, based on a calculation criterion, imbalances between the output buffers 233 of the upstream WSs 23 and the input buffer 211 of the transportation source WS 21.

The importance degree calculation unit 13 calculates a importance degree (a degree of priority) of a transportation operation for each combination of a transportation source WS 21 and a transportation destination WS 22, based on a transportation cost required for a transportation operation of transporting an article 31 from the transportation source WS 21 to the transportation destination WS 22, presence status information relating to the transportation source WS 21 and the transportation destination WS 22 that is acquired by the acquisition unit 11, and the magnitude of a degree of influence calculated by the influence degree calculation unit 12.

The importance degree calculation unit 13 may acquire the transportation costs from the transportation resources 30 or an external device (not illustrated) capable of measuring transportation costs through transportation operations or may have a function of measuring the transportation costs. However, specifically, the transportation cost is information indicating, for example, time required for transportation, transportation distance, the number of operators required for transportation, the number of used transportation vehicles, such as an automated guided vehicle (AGV) and a forklift, or the types and amount of used resources, such as an elevator and a crane. The transportation cost can be acquired through, for example, sensors attached to operators and transportation vehicles, reading of tags attached to articles 31, timers, or information input into the system by operators.

The importance degree calculation unit 13 transmits, to a transportation resource 30, information indicating a transportation operation for a combination of a transportation source WS 21 and a transportation destination WS 22 the calculated importance degree of which is the greatest as information indicating a transportation operation that the transportation resource 30 is to perform next. Each transportation resource 30 next performs a transportation operation for a combination of a transportation source WS 21 and a transportation destination WS 22 indicated by information received from the importance degree calculation unit 13.

The updating unit 14, after a transportation operation for a combination of a transportation source WS 21 and a transportation destination WS 22 selected based on the degrees of importance calculated by the importance degree calculation unit 13 has been performed, updates a calculation criterion of a degree of influence related to the transportation operation, based on presence status information relating to the transportation source WS 21 and the transportation destination WS 22. That is, the updating unit 14, after the transportation operation has been performed, updates a specific value used in the above-described weighting and indicated by the calculation criterion of the degree of influence, based on an elimination status of imbalance between the output buffer 213 of the transportation source WS 21 and the input buffer 221 of the transportation destination WS 22.

For example, when a difference (or a ratio) between the amount of buffer used (a third amount) (or the buffer usage rate (a third usage rate)) of the output buffer 213 of the transportation source WS 21 and the amount of buffer used (a fourth amount) (or the buffer usage rate (a fourth usage rate)) of the input buffer 221 of the transportation destination WS 22 after the transportation operation has been performed is equal to or greater than a first threshold value (a maximum value of allowable imbalance), the updating unit 14 determines that the imbalance has not been eliminated as expected. The determination result is considered to be caused by the magnitude of a degree of influence of an upstream WS(s) 23 on the transportation source WS 21, which was calculated by the influence degree calculation unit 12, having been too small. Therefore, in this case, the updating unit 14 increases a weighting coefficient used in the above-described weighting and indicated by the calculation criterion of the degree of influence in such a way that the magnitude of the degree of influence is calculated to be greater by the influence degree calculation unit 12.

Alternatively, when a difference (or a ratio) between the amount of buffer used (or the buffer usage rate) of the output buffer 213 of the transportation source WS 21 and the amount of buffer used (or the buffer usage rate) of the input buffer 221 of the transportation destination WS 22 after the transportation operation has been performed is equal to or less than a second threshold value (a minimum value of allowable imbalance), the updating unit 14 determines that the imbalance has been eliminated more than necessary. The determination result is considered to be caused by the magnitude of a degree of influence of an upstream WS(s) 23 on the transportation source WS 21, which was calculated by the influence degree calculation unit 12, having been too great. Therefore, in this case, the updating unit 14 decreases a weighting coefficient used in the above-described weighting and indicated by the calculation criterion of the degrees of influence in such a way that the magnitude of the degree of influence is calculated to be smaller by the influence degree calculation unit 12.

An amount by which a weighting coefficient is increased or decreased by the updating unit 14 may be a value that is statically calculated based on, for example, a management index relating to the factory or the like, which is an object to be controlled by the transportation operation control system 1, or predetermined information representing configurations (buffer sizes and the like) of the workstations. Alternatively, an amount by which a weighting coefficient is increased or decreased by the updating unit 14 may be a value that is dynamically calculated based on current presence status information of articles 31 relating to the workstations or a change that the presence status information has undergone as time elapses (a change status relating to imbalance).

The detection unit 15 detects that a transportation operation of an article 31 by a transportation resource 30 from a transportation source WS 21 to a transportation destination WS 22 is completed. The detection unit 15 detects completion of a transportation operation by, for example, monitoring an operational status of the transportation resource 30. More specifically, the detection unit 15 automatically detects completion of a transportation operation by using, for example, passage sensors using infrared rays or ultrasonic waves or laser range finders, image recognition using cameras, or RFIDs stuck on the articles 31 or the like. Alternatively, the detection unit 15 may detect completion of a transportation operation by an input operation, such as pressing down of a button by an operator.

Transportation operations the completion of which is to be detected by the detection unit 15 may be all transportation operations performed in the transportation operation control system 1 or some transportation operations. The detection unit 15 may set, for example, transportation operations performed by transportation resources 30 present within a predetermined region or transportation operations of transporting a specific article 31 (for example, an article that needs to be produced hurriedly) as transportation operations the completion of which is to be detected.

The above-described updating unit 14, triggered by a detection by the detection unit 15, updates a calculation criterion of a degree of influence as described above. Alternatively, the updating unit 14 may update a calculation criterion of a degree of influence after a predetermined period has elapsed since the detection unit 15 detected completion of a transportation operation. Still alternatively, the updating unit 14 may update a calculation criterion of a degree of influence at a regular timing. Still alternatively, the updating unit 14 may update a calculation criterion of a degree of influence when information indicating that an environment relating to transportation operations has changed is obtained from the outside.

Next, operation of the present example embodiment will be described using a specific example.

Figure 3:
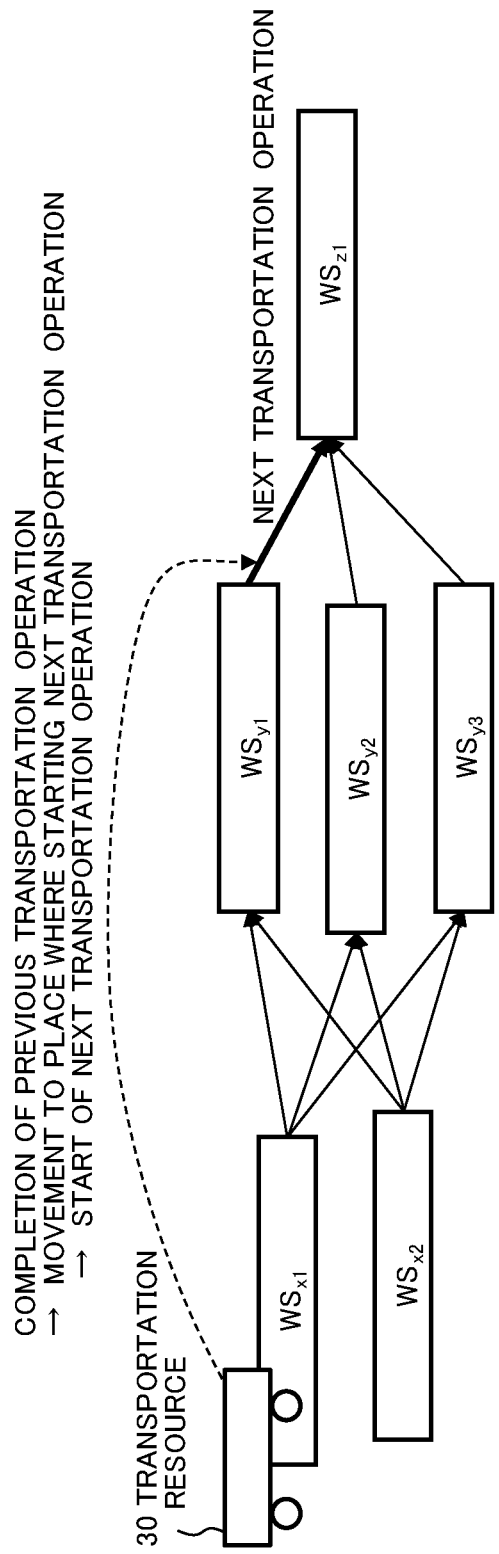
FIG. 3 is a diagram exemplifying a configuration of a network constituted by workstations to be controlled by a transportation operation control device 10 according to the first example embodiment of the present invention.

FIG. 3 is a diagram exemplifying a configuration of a network constituted by workstations to be controlled by the transportation operation control device 10 according to the present example embodiment. In the present example embodiment, it is assumed that six workstations ($WS_{x1}$, $WS_{x2}$, $WS_{y1}$, $WS_{y2}$, $WS_{y3}$, and $WS_{z1}$) are present. It is also assumed that nine links each of which connects any two WSs to each other as the transportation source WS 21 and the transportation destination WS 22 illustrated in FIG. 1 are present. However, the numbers of workstations and links to be controlled by the transportation operation control device 10 are not limited to the above-described numbers. When the transportation source WS 21 illustrated in FIG. 1 is equivalent to any of $WS_{y1}$ to $WS_{y3}$ and the transportation destination WS 22 illustrated in FIG. 1 is equivalent to $WS_{z1}$, the upstream WSs 23 illustrated in FIG. 1 are equivalent to $WS_{x1}$ and $WS_{x2}$.

FIG. 4 is a diagram conceptually exemplifying a configuration of the WS link management table 161 stored in the storage unit 16. The WS link management table 161 exemplified in FIG. 4 is information indicating a list of links between workstations in the network constituted by the workstations exemplified in FIG. 3. The WS link management table 161 associates an identifier of a link, an identifier of a transportation source WS, and an identifier of a transportation destination WS with one another. The WS link management table 161 exemplified in FIG. 4 indicates that, for example, a link relating to $WS_{y1}$, serving as a transportation source WS 21, and $WS_{z1}$, serving as a transportation destination WS 22, is denoted by y1z1. The WS link management table 161 is assumed to be, for example, generated and stored in the storage unit 16 by an administrator of the transportation operation control system 1.

In the present example embodiment, it is assumed that a transportation operation is performed between a transportation source WS and a transportation destination WS in each of the combinations illustrated in FIGS. 3 and 4 and no transportation operation is performed between a transportation source WS and a transportation destination WS in any combination that is not illustrated in FIGS. 3 and 4. In the present example embodiment, it is also assumed that neither a transportation operation from the upstream side with respect to $WS_{x1}$ and $WS_{x2}$ nor a transportation operation to the downstream side with respect to $WS_{z1}$ is performed.

FIG. 5 is a diagram conceptually exemplifying a configuration of the transportation cost identifier management table 162 stored in the storage unit 16. In the present example embodiment, it is assumed that the transportation source WS 21 and the transportation destination WS 22 illustrated in FIG. 1 are in sufficient proximity to each other and, compared with a cost required for a transportation resource 30 to move to a point at which starting a transportation operation, a cost required for the transportation operation itself is thus comparatively negligible. That is, it is, for example, assumed that, in FIG. 3, when a transportation resource 30 that is positioned at the input buffer of $WS_{x1}$ after having completed a transportation operation next performs a transportation operation with $WS_{y1}$ set as a transportation source WS 21 and $WS_{z1}$ set as a transportation destination WS 22, compared with a cost required for the transportation resource 30 to move from the input buffer of $WS_{x1}$ to the output buffer of $WS_{y1}$, a cost required for the transportation operation from $WS_{y1}$ to $WS_{z1}$ is comparatively negligible.

The transportation cost identifier management table 162 according to the present example embodiment associates an identifier of a transportation cost required for a transportation resource 30 to, in order to perform a next transportation operation, move from a movement origin (a place at which having completed the previous transportation operation) to a movement destination (a place at which starting the next transportation operation), an identifier of a movement origin WS, and an identifier of a movement destination WS with one another. The item referred to as "note" in FIG. 5 is included for the convenience of description. The transportation cost identifier management table 162 exemplified in FIG. 5 indicates that, for example, a transportation cost required for a transportation resource 30 to move from the input buffer of $WS_{x1}$, serving as a movement origin, to the output buffer of $WS_{y1}$, serving as a movement destination, is denoted by $C_{x1y1}$. The transportation cost identifier management table 162 is assumed to be, for example, generated and stored in the storage unit 16 by the administrator of the transportation operation control system 1.

FIG. 6 is a diagram conceptually exemplifying a configuration of the transportation cost management table 163 stored in the storage unit 16. The transportation cost management table 163 is generated or updated by the importance degree calculation unit 13 illustrated in FIG. 1 or through information input or the like by the administrator of the transportation operation control system 1. The importance degree calculation unit 13 acquires that a transportation cost required for a transportation resource 30 to move from the input buffer of $WS_{x1}$ to the output buffer of $WS_{y1}$ is "4" from, for example, an external device (the transportation resource 30 or the like). The importance degree calculation unit 13 acquires that an identifier of the transportation cost is $C_{x1y1}$ by referring to the transportation cost identifier management table 162 exemplified in FIG. 5. With this acquisition, the importance degree calculation unit 13 adds a record in which the above-described transportation cost identifier and transportation cost are associated with each other to the transportation cost management table 163.

The transportation costs are values obtained based on predetermined criteria relating to distances that the transportation resources 30 move, periods required for the movements, types of the transportation resources 30 (for example, a platform truck), presence or absence of passage through a place where interference with another transportation operation, production operation, or the like may occur, ease of passage relating to routes taken at the time of movements, and the like. As a criterion relating to ease of passage relating to routes, various criteria, such as whether a route passes through a narrow space, whether there is a slope or a level difference along the way, and whether it is required to use a limited number of elevators, are conceivable.

The above-described WS link management table 161, transportation cost identifier management table 162, and transportation cost management table 163 may, for example, be generated by the transportation operation control device 10 or an external device, based on a layout diagram or the like of the factory or warehouse. Alternatively, the WS link management table 161, transportation cost identifier management table 162, and transportation cost management table 163 may be generated by operators, a layout designer of the factory or warehouse, or the like. Still alternatively, the WS link management table 161, transportation cost identifier management table 162, and transportation cost management table 163 may be generated by a combination of automatic generation by the transportation operation control device 10 or an external device and information input by operators or the like.

FIG. 7 is a diagram conceptually exemplifying a configuration of the buffer management table 165 stored in the storage unit 16. The buffer management table 165 is generated or updated by the acquisition unit 11 illustrated in FIG. 1. The buffer management table 165 associates a buffer identifier with a buffer usage rate. With regard to the buffer identifier, I and O denote the input buffer of a workstation and the output buffer of a workstation, respectively. In FIG. 7, for example, $I_{x1}$ and $O_{z1}$ denote the input buffer of $WS_{x1}$ and the output buffer of $WS_{z1}$ illustrated in FIG. 3, respectively.

FIG. 8 is a diagram conceptually exemplifying a configuration of the calculation criterion management table 164 stored in the storage unit 16. The calculation criterion management table 164 indicates values of weighting coefficients α of degrees of influence, each of which is used when the magnitude of a degree of influence of an upstream WS(s) 23 on a transportation source WS 21 relating to a transportation operation is calculated. That is, the influence degree calculation unit 12 calculates the magnitude of each degree of influence by weighting, using one of the weighting coefficients α of degrees of influence, an imbalance(s) between the output buffer(s) 233 of an upstream WS(s) 23 and the input buffer 211 of a transportation source WS 21. In the calculation criterion management table 164 exemplified in FIG. 8, weighting coefficients $α_{y1}$ to $α_{y3}$ of degrees of influence represent, in this order, weighting coefficients of degrees of influence relating to influences that $WS_{y1}$ to $WS_{y3}$ exemplified in FIG. 3 receive from $WS_{x1}$ and $WS_{x2}$, serving as the upstream WSs 23.

In the case of the example illustrated in FIG. 3, the influence degree calculation unit 12 calculates the magnitude of a degree of influence of $WS_{x1}$ and $WS_{x2}$ on $WS_{y1}$ relating to a transportation operation, using, for example, the equation 1.

Magnitude of degree of influence with respect to
$$WS_{y1} = α_{y1} Σ_{i=1}^{2}(O_{xi} - I_{y1})$$ (Equation1)

The influence degree calculation unit 12 also calculates the magnitudes of degrees of influence with respect to $WS_{y2}$ and $WS_{y3}$, using the weighting coefficients $α_{y2}$ and $α_{y3}$ of degrees of influence, respectively, in a similar manner.

The importance degree calculation unit 13 illustrated in FIG. 1 calculates a importance degree relating to each transportation operation, based on a degree of spatial imbalance (lack of balance) or the like indicated by the above-described presence status information (for example, a usage rate of the output buffer 213 of a transportation source WS 21 and a usage rate of the input buffer 221 of a transportation destination WS 22), a transportation cost, and the magnitude of a degree of influence calculated by the influence degree calculation unit 12. The importance degree is an index indicating a degree of priority of each transportation operation.

When, for example, the detection unit 15 detects completion of any transportation operation, the importance degree calculation unit 13 calculates a importance degree with respect to each combination (link) between a transportation source WS 21 and a transportation destination WS 22 the importance degree of which is to be calculated. The timing at which the importance degree calculation unit 13 calculates degrees of importance may be a point of time when a predetermined period has elapsed since the completion of any transportation operation or a point of time a predetermined period before a time point when a transportation operation is expected to be completed. When a predetermined period is required for switching transportation operations, the importance degree calculation unit 13 may calculate degrees of importance at a timing determined in consideration of the period. Alternatively, in response to a change in the status of the factory or warehouse (for example, a production apparatus or a transportation device has malfunctioned or a trouble has occurred in a specific area), the importance degree calculation unit 13 may recalculate degrees of importance with suspension of a transportation operation in execution and subsequent source of another transportation operation taken into consideration.

The larger is the amount of buffer used or the usage rate of the output buffer 213 of a transportation source WS 21, the greater the importance degree calculation unit 13 calculates a importance degree to be. The smaller is the amount of buffer used or the usage rate of the input buffer 221 of a transportation destination WS 22, the greater the importance degree calculation unit 13 calculates a importance degree to be. The smaller is a transportation cost, the greater the importance degree calculation unit 13 calculates a importance degree to be.

The above-described degree of imbalance relating to buffer usage rates or the like is a value that can be calculated based on a difference or a ratio between a usage rate of the output buffer 213 of a transportation source WS 21 and a usage rate of the input buffer 221 of a transportation destination WS 22, another evaluation function, or the like. The larger is the usage rate of the output buffer 213 of the transportation source WS 21 and the smaller is the usage rate of the input buffer 221 of the transportation destination WS 22, the greater the degree of imbalance relating to the buffer usage rates becomes.

When calculating a importance degree, the importance degree calculation unit 13 may use a degree of imbalance based on a usage rate of the output buffer 213 of a transportation source WS 21 without using a usage rate of the input buffer 221 of a transportation destination WS 22. Alternatively, the importance degree calculation unit 13 may use a degree of imbalance based on a usage rate of the input buffer 221 of a transportation destination WS 22 without using a usage rate of the output buffer 213 of a transportation source WS 21.

An example of a calculation formula of a degree IM of importance, which the importance degree calculation unit 13 uses, is shown in the equation 2.

$$IM_{ab} = \frac{(O_a - I_b) + \alpha_a \sum_{i=1}^{2}(O_{di} - I_a)}{C_{ea}} \quad \text{(Equation 2)}$$

In the equation 2, however, a, b, di, and e denote information for identifying workstations and, when, for example, the workstations exemplified in FIG. 3 exist, denote any of x1, x2, y1 to y3, and z1. $IM_{ab}$ denotes a importance degree relating to a transportation operation from $WS_a$ to $WS_b$. $O_a$ denotes a usage rate of the output buffer of $WS_a$ serving as a transportation source WS 21. $I_b$ denotes a usage rate of the input buffer of $WS_b$ serving as a transportation destination WS 22. $\alpha_a$ denotes a weighting coefficient of a degree of influence relating to $WS_a$ serving as a transportation source WS 21. $O_{di}$ denotes a usage rate of the output buffer of $WS_{di}$ serving as an upstream WS 23. $I_a$ denotes a usage rate of the input buffer of $WS_a$ serving as a transportation source WS 21. $C_{ea}$ denotes a transportation cost required for a transportation resource 30 to move from the input buffer of $WS_e$ serving as a movement origin (a place at which the previous transportation operation is completed) to the output buffer of $WS_a$ serving as a transportation source WS 21 (a place at which the next transportation operation is started). The importance degree calculation unit 13 calculates, as a degree IM of importance, a value that is, as expressed by the equation 2, obtained by dividing, by a transportation cost, a value obtained by adding the magnitude of a degree of influence calculated by the influence degree calculation unit 12 to a difference between a usage rate of the output buffer of a transportation source workstation $WS_a$ and a usage rate of the input buffer of a transportation destination workstation $WS_b$.

Another example of the calculation formula of a degree IM of importance is shown in the equation 3.

$$IM_{ab} = (O_a - I_b) + \alpha_a \sum_{i=1}^{2}(O_{di} - I_a) - \beta C_{ea} \quad \text{(Equation 3)}$$

In the equation 3, however, β (β>0) denotes a predetermined weighting coefficient.

A case where, for example, the importance degree calculation unit 13 calculates a degree IM of importance by using the above-described equation 2 will be described.

FIG. 9 is a diagram conceptually exemplifying a configuration of the importance degree management table 166 stored in the storage unit 16. The importance degree management table 166 is generated or updated by the importance degree calculation unit 13 illustrated in FIG. 1. The importance degree management table 166 associates a link identifier and a importance degree of a transportation operation with each other. The calculation formulae in FIG. 9 are included for the convenience of description.

The importance degree calculation unit 13 acquires a link identifier by referring to the WS link management table 161 exemplified in FIG. 4. The importance degree calculation unit 13 acquires a usage rate $O_a$ of the output buffer of $WS_a$ serving as a transportation origin, a usage rate $I_b$ of the input buffer of $WS_b$ serving as a transportation destination, usage rates $O_{di}$ of the output buffers of $WS_{di}$ serving as upstream WSs, and a usage rate $I_a$ of the input buffer of $WS_a$ serving as a transportation origin by referring to the buffer management table 165 exemplified in FIG. 7. The importance degree calculation unit 13 acquires a weighting coefficient of a degree of influence by referring to the calculation criterion management table 164 exemplified in FIG. 8. The importance degree calculation unit 13 acquires a transportation cost required for a transportation resource 30 to move from the input buffer of $WS_e$ serving as a movement origin to the output buffer of $WS_a$ serving as a movement destination (transportation origin) by referring to the transportation cost management table 163 exemplified in FIG. 6. The importance degree calculation unit 13 calculates a degree $IM_{ab}$ of importance as illustrated in FIG. 9 by using the equation 2.

For example, the importance degree calculation unit 13 calculates a degree $IM_{y3z1}$ of importance relating to a transportation operation from $WS_{y3}$ to $WS_{z1}$ as "{60−50+1× (100−90+100−90)}/2=15" as shown by the calculation formula in FIG. 9. However, "×" and "/" are operators representing multiplication and division, respectively. The importance degree calculation unit 13 also calculates degrees IM of importance relating to transportation operations with respect to other eight links in a similar manner.

The importance degree calculation unit 13 determines a link the degree IM of importance of which is the greatest as a link with respect to which a transportation operation is to be performed next. In the case of the example illustrated in FIG. 9, the link the degree IM of importance of which is the greatest is y3z1. Therefore, the importance degree calculation unit 13 determines the transportation operation from $WS_{y3}$ to $WS_{z1}$ as the link with respect to which a transportation operation is to be performed next.

If the importance degree calculation unit 13 calculated degrees IM of importance without incorporating the above-described degrees of influence into the calculation, the link the degree IM of importance of which is the greatest would not be y3z1 because $IM_{y1z1}$, $IM_{y2z1}$, and $IM_{y3z1}$ would be "7.5", "6.7", and "5", respectively, in the example illustrated in FIG. 9. That is, the link the degree IM of importance of which is the greatest differs depending on whether the above-described degrees of influence are taken into consideration in the calculation of the degrees IM of importance.

The importance degree calculation unit 13 may be configured to reduce the number of times of calculation of degrees of importance by, on this occasion, for example, storing a plurality of links in descending order of the degrees of importance in the storage unit 16 as the next and subsequent transportation operations.

The importance degree calculation unit 13 transmits information indicating a transportation operation that includes information indicating the link identifier relating to the determined next transportation operation to a transportation resource 30. On this occasion, the importance degree calculation unit 13 may be configured to transmit, at the same time as the transmission of the information, information indicating a workstation to serve as a movement destination (transportation origin) and a workstation to serve as a transportation destination or transmit, after the transportation resource 30 has moved to (arrived at) the workstation to serve as the movement destination, information indicating a workstation to serve as a transportation destination to the transportation resource 30.

Each transportation resource 30 may, after receiving information indicating a transportation operation from the importance degree calculation unit 13, display, for example, information indicating places at which a transportation source WS 21 and a transportation destination WS 22 are located and a transportation route on a display device (a monitor or the like) with which the transportation resource 30 is equipped. Alternatively, the transportation resource 30 may present the received information indicating a transportation operation to an operator by sound, using a sound output device (a headphone or the like) with which the transportation resource 30 is equipped. Still alternatively, the transportation resource 30 may display the spatial coordinates of or a marker serving as a guide of a place at which the workstation to serve as a transportation destination is located on the display device.

The transportation resource 30 moves from the input buffer of a movement origin WS ($WS_{x1}$ in the example illustrated in FIG. 3) (a place at which the previous transportation operation is completed) to the output buffer of a movement destination WS (that is, a transportation source WS 21) (a place at which the next transportation operation is to be started) in accordance with the received information indicating a transportation operation. On this occasion, the transportation resource 30 measures a cost required for the movement as a transportation cost. The transportation resource 30, after having moved to the transportation source WS 21 ($WS_{y3}$ in the example illustrated in FIG. 9), transports an article 31 from the output buffer 213 of the transportation source WS 21 to the input buffer 221 of a transportation destination WS 22 ($WS_{z1}$ in the example illustrated in FIG. 9).

After the detection unit 15 has detected that a transportation operation has been completed, the updating unit 14 illustrated in FIG. 1 updates the calculation criterion management table 164. In the case of the above-described example illustrated in FIG. 9, after a transportation operation of transporting an article 31 from $WS_{y3}$ to $WS_{z1}$ has been completed, the updating unit 14 evaluates and subsequently updates the value of the weighting coefficient $\alpha_{y3}$ of a degree of influence indicated by the calculation criterion management table 164, based on a status in which, with respect to $WS_{y3}$ and $WS_{z1}$, a buffer imbalance before performing the transportation operation has been eliminated by performing the transportation operation.

The updating unit 14 updates a weighting coefficient $\alpha$ of a degree of influence indicated by the calculation criterion management table 164 in accordance with, for example, update criteria as will be described below.

When the absolute value of a buffer imbalance relating to $WS_{y3}$ and $WS_{z1}$ (in the case of the example illustrated in FIG. 9, "$O_{y3}-I_{z1}$") is equal to or greater than a first threshold value (the maximum value of allowable imbalances), the updating unit 14 determines that the weighting coefficient $\alpha_{y3}$ is too small and increases the weighting coefficient $\alpha_{y3}$.

When the absolute value of a buffer imbalance relating to $WS_{y3}$ and $WS_{z1}$ is equal to or less than a second threshold value (the minimum value of allowable imbalances), the updating unit 14 determines that the weighting coefficient $\alpha_{y3}$ is too large and decreases the weighting coefficient $\alpha_{y3}$.

When a value indicating a status in which the buffer imbalance relating to $WS_{y3}$ and $WS_{z1}$ has increased or decreased caused by performing a transportation operation (a ratio or a difference representing a degree of increase or decrease) is equal to or greater than a third threshold value (the maximum value of allowable degrees of change in the imbalance), the updating unit 14 determines that the weighting coefficient $\alpha_{y3}$ is too large and decreases the weighting coefficient $\alpha_{y3}$.

When a value indicating a status in which the buffer imbalance relating to $WS_{y3}$ and $WS_{z1}$ has increased or decreased caused by performing a transportation operation (a ratio or a difference representing a degree of increase or decrease) is equal to or less than a fourth threshold value (the minimum value of allowable degrees of change in the imbalance), the updating unit 14 determines that the weighting coefficient $\alpha_{y3}$ is too small and increases the weighting coefficient $\alpha_{y3}$.

When an index relating to the number of times that a transportation operation from $WS_{y3}$ to $WS_{z1}$ is performed during a predetermined period (the absolute value of the number, a ratio of the number compared with the numbers of times of other transportation operations, or the like) is equal to or greater than a fifth threshold value (the maximum value of allowable values relating to the number of times of transportation), the updating unit 14 determines that the weighting coefficient $\alpha_{y3}$ is too large and decreases the weighting coefficient $\alpha_{y3}$.

When an index relating to the number of times that a transportation operation from $WS_{y3}$ to $WS_{z1}$ is performed during a predetermined period (the absolute value of the number, a ratio of the number compared with the numbers of times of other transportation operations, or the like) is equal to or less than a sixth threshold value (the minimum value of allowable values relating to the number of times of transportation), the updating unit 14 determines that the weighting coefficient $\alpha_{y3}$ is too small and increases the weighting coefficient $\alpha_{y3}$.

In the case of the example illustrated in FIG. 9, the updating unit 14, for example, increases the value of the weighting coefficient $\alpha_{y3}$ indicated by the calculation criterion management table 164 exemplified in FIG. 8 from "1" to "1.2" or decreases the value of the weighting coefficient $\alpha_{y3}$ from "1" to "0.8", in accordance with the above-described update criteria.

In the case of the example illustrated in FIG. 9, the updating unit 14 updates the calculation criterion management table 164 at, for example, a timing that will be described below:

when the transportation operation from $WS_{y3}$ to $WS_{z1}$ is completed;

when a predetermined period has elapsed since the transportation operation from $WS_{y3}$ to $WS_{z1}$ was completed;

at a regular (periodical) timing; or when an environment relating to transportation operations has changed due to a sudden occurrence of an event caused by an external factor.

Figure 10:
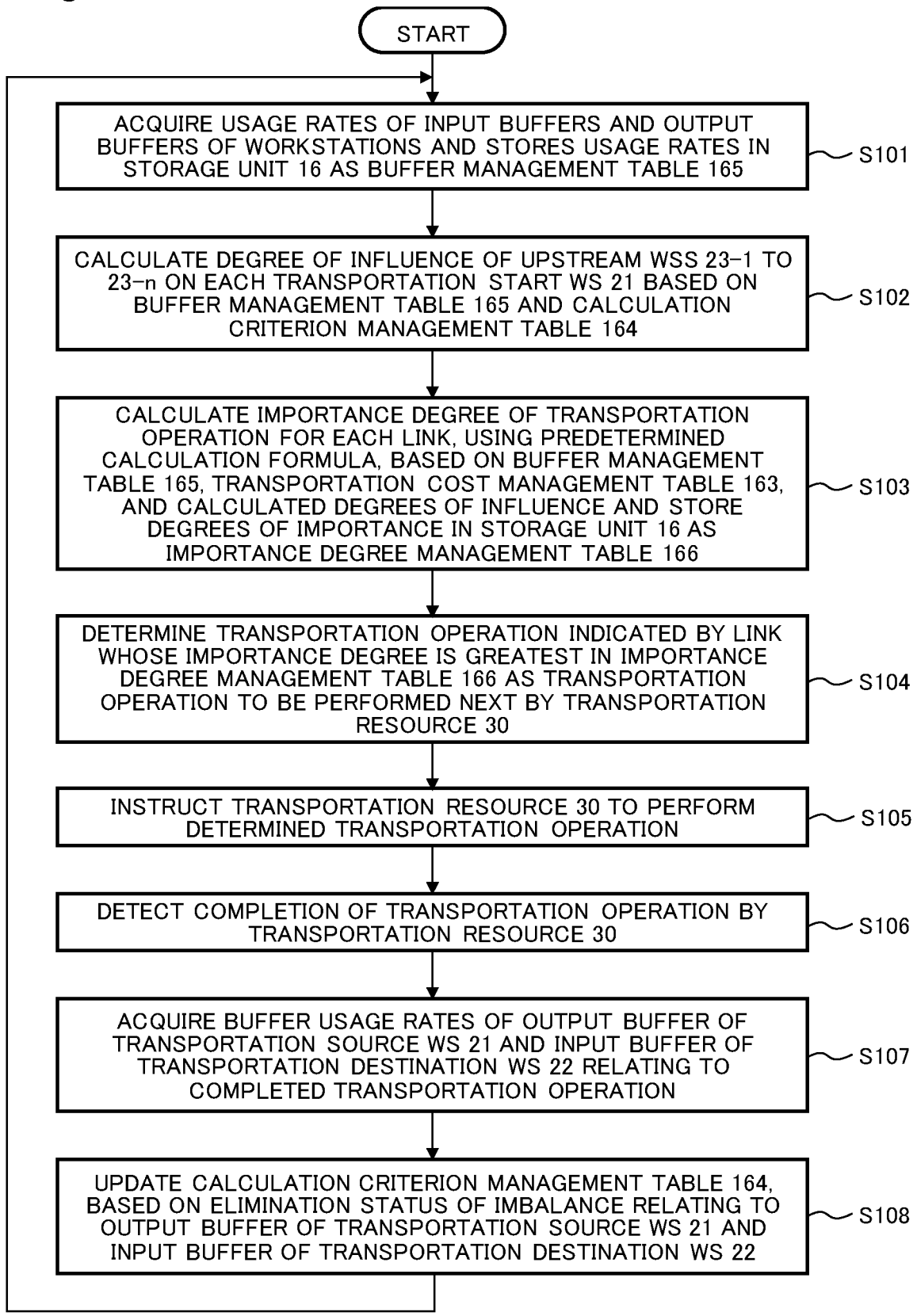
FIG. 10 is a flowchart illustrating operation of the transportation operation control device 10 according to the first example embodiment of the present invention.

Next, with reference to a flowchart in FIG. 10, operation (processing) of the transportation operation control device 10 according to the present example embodiment will be described in detail.

The acquisition unit 11 acquires usage rates of the input buffers and the output buffers of workstations and stores the usage rates in the storage unit 16 as the buffer management table 165 (step S101). The influence degree calculation unit 12 calculates a degree of influence of upstream WSs 23-1 to 23-*n* on each transportation source WS 21, based on the buffer management table 165 and the calculation criterion management table 164 (step S102).

The importance degree calculation unit 13 calculates a importance degree of a transportation operation for each link, using a predetermined calculation formula, based on the buffer management table 165, the transportation cost management table 163, and the degrees of influence calculated by the influence degree calculation unit 12 and stores the degrees of importance in the storage unit 16 as the importance degree management table 166 (step S103). The importance degree calculation unit 13 determines a transportation operation indicated by a link the importance degree of which is the greatest in the importance degree management table 166 as a transportation operation that a transportation resource 30 is to perform next (step S104). The importance degree calculation unit 13 instructs the transportation resource 30 to perform the determined transportation operation (step S105).

The detection unit 15 detects that the transportation resource 30 has completed the transportation operation determined by the importance degree calculation unit 13 (step S106). The acquisition unit 11, after the transportation operation has been completed, acquires buffer usage rates of the output buffer of the transportation source WS 21 and the input buffer of a transportation destination WS 22 relating to the transportation operation (step S107). The updating unit 14 updates the calculation criterion management table 164, based on an elimination status of imbalance relating to the output buffer of the transportation source WS 21 and the input buffer of the transportation destination WS 22 (step S108), and the processing returns to step S101.

The transportation operation control device 10 according to the present example embodiment is capable of, when, in a factory or the like, loads on operation processes and transportation capability for articles change, surely performing transportation control of the articles that avoids a reduction in processing efficiency in the entire factory caused by a downstream side (succeeding process side) process being influenced by fluctuations in an upstream side (pre-process side) process. The reason for the capability is that the transportation operation control device 10 calculates degrees of importance of transportation operations, based on the magnitudes of degrees of influence of upstream side sites on downstream side sites and, after a transportation operation selected based on the degrees of importance has been performed, also updates a calculation criterion of a degree of influence, based on presence statuses of articles at sites related to the transportation operation.

Hereinafter, advantageous effects achieved by the transportation operation control device 10 according to the present example embodiment will be described in detail.

In a general factory, warehouse, or the like, transportation capability and a transportation load relating to transportation operations between sites (workstations) dynamically change because of various factors. In such an environment, there is a possibility that processing efficiency in the entire factory or warehouse is substantially reduced due to a workstation positioned on the downstream side being substantially influenced by a workstation positioned on the upstream side in the operation process.

For example, when the number of articles processed by a workstation on the upstream side has suddenly increased, there is a possibility that overflow of articles at the input buffer and the like of a workstation on the downstream side causes stable, efficient production processing and transportation processing in the entire factory or warehouse to be inhibited. Alternatively, when the number of articles processed by a workstation on the upstream side has rapidly decreased, surplus of the transportation resources (that is, inappropriate allocation of the transportation resources) may cause efficient production processing and transportation processing in the entire factory or warehouse to be inhibited. Therefore, it is a problem to be solved to, in such an environment, avoid a substantial reduction in processing efficiency in the entire factory or warehouse due to a workstation positioned on the downstream side being substantially influenced by fluctuation relating to a workstation positioned on the upstream side in the operation process.

In order to solve such a problem, the transportation operation control device 10 according to the present example embodiment includes the acquisition unit 11, the influence degree calculation unit 12, the importance degree calculation unit 13, and the updating unit 14 and, for example, operates as described above with reference to FIGS. 1 to 10. That is, the acquisition unit 11 acquires presence status information representing presence statuses of articles 31 at a plurality of sites (workstations). The influence degree calculation unit 12 calculates, among the plurality of workstations, based on presence status information relating to each transportation source WS 21 and an upstream WS(s) 23 that influence(s) a presence status of articles 31 at the transportation source WS 21, the magnitude of a degree of influence of the upstream WS(s) 23 on the transportation source WS 21, using a calculation criterion. The importance degree calculation unit 13 calculates, among the plurality of workstations, a importance degree of a transportation operation for each combination of a transportation source WS 21 and a transportation destination WS 22, based on a transportation cost required for the transportation operation of transporting an article 31 from the transportation source WS 21 to the transportation destination WS 22, the presence status information relating to the transportation source WS 21 and the transportation destination WS 22, and the magnitude of the degree of influence. The updating unit 14 updates the calculation criterion, based on the presence status information relating to a transportation source WS 21 and a transportation destination WS 22 after a transportation operation selected based on the degrees of importance has been performed.

That is, the transportation operation control device 10 according to the present example embodiment determines degrees of importance (degrees of priority) of transportation operations, based on the magnitudes of degrees of influence of the upstream side on transportation source WSs 21, imbalances in buffers between transportation source WSs 21 and transportation destination WSs 22, and transportation costs relating to transportation operations from transportation source WSs 21 to transportation destination WSs 22. After a transportation operation based on the degrees of importance has been performed, the transportation operation control device 10 updates a calculation criterion of a degree of influence, based on a status in which an imbalance in the buffers between a transportation source WS 21 and a transportation destination WS 22 has been eliminated. That is, even when transported articles and transportation loads relating to transportation operations frequently and substantially change because demand of articles suddenly and substantially changes and the amount of articles accumulating in buffers on the upstream side is unstable, the transportation operation control device 10 is capable of dynamically determining a next transportation operation, based on usage statuses of buffers of workstations and the magnitudes of degrees of influence relating to transportation operations received from the upstream side. Therefore, the transportation operation control device 10 according to the present example embodiment is capable of appropriately performing stable, efficient transportation control that can promptly follow a sudden increase or decrease in transportation operations occurring influenced by the upstream side.

The updating unit 14 according to the present example embodiment can use, as an amount based on which a weighting coefficient included in the calculation criteria of degrees of influence is increased or decreased, a value statically calculated based on predetermined information representing, for example, configurations (buffer sizes and the like) of workstations. Alternatively, the updating unit 14 can also use, as an amount based on which a weighting coefficient included in the calculation criteria of degrees of influence is increased or decreased, a value dynamically calculated based on current presence status information of articles 31 relating to workstations or a change that the presence status information has undergone as time elapses (a change status relating to imbalance). Therefore, the transportation operation control device 10 according to the present example embodiment is capable of updating the calculation criteria of degrees of influence, based on a flexible policy.

The updating unit 14 according to the present example embodiment updates a calculation criterion of a degree of influence at various timings, such as a timing when the detection unit 15 detects completion of a transportation operation selected based on degrees of importance, a timing when a predetermined period has elapsed since the detection unit 15 detected completion of a transportation operation, a regular timing, and a timing when information indicating that an environment relating to transportation operations has changed is obtained. Therefore, the transportation operation control device 10 according to the present example embodiment is capable of performing the above-described control of transportation operations more dynamically and flexibly.

The transportation operation control device 10 according to the present example embodiment may be configured to include, in upstream WSs 23, a workstation positioned two or more processes on the upstream side (the pre-process side) with respect to a transportation source WS 21. This configuration enables the transportation operation control device 10 according to the present example embodiment to further increase the above-described effect of surely performing transportation control of the articles that avoids a reduction in processing efficiency in the entire factory caused by a downstream side (succeeding process side) process being influenced by fluctuations in an upstream side (pre-process side) process.

The above-described transportation operation control device 10 according to the present example embodiment performs control under the assumption that the transportation source WS 21 and the transportation destination WS 22 illustrated in FIG. 1 are in sufficient proximity to each other and, compared with a cost required for a transportation resource 30 to move to a point at which starting a transportation operation, a cost required for the transportation operation itself is thus comparatively negligible. Conversely, the transportation operation control device 10 according to the present example embodiment may assume that the transportation source WS 21 and the transportation destination WS 22 illustrated in FIG. 1 are positioned at a certain distance from each other and, compared with a cost required for the transportation operation itself, a cost required for a transportation resource 30 to move to a point at which starting a transportation operation is thus comparatively negligible.

Second Example Embodiment

Figure 11:
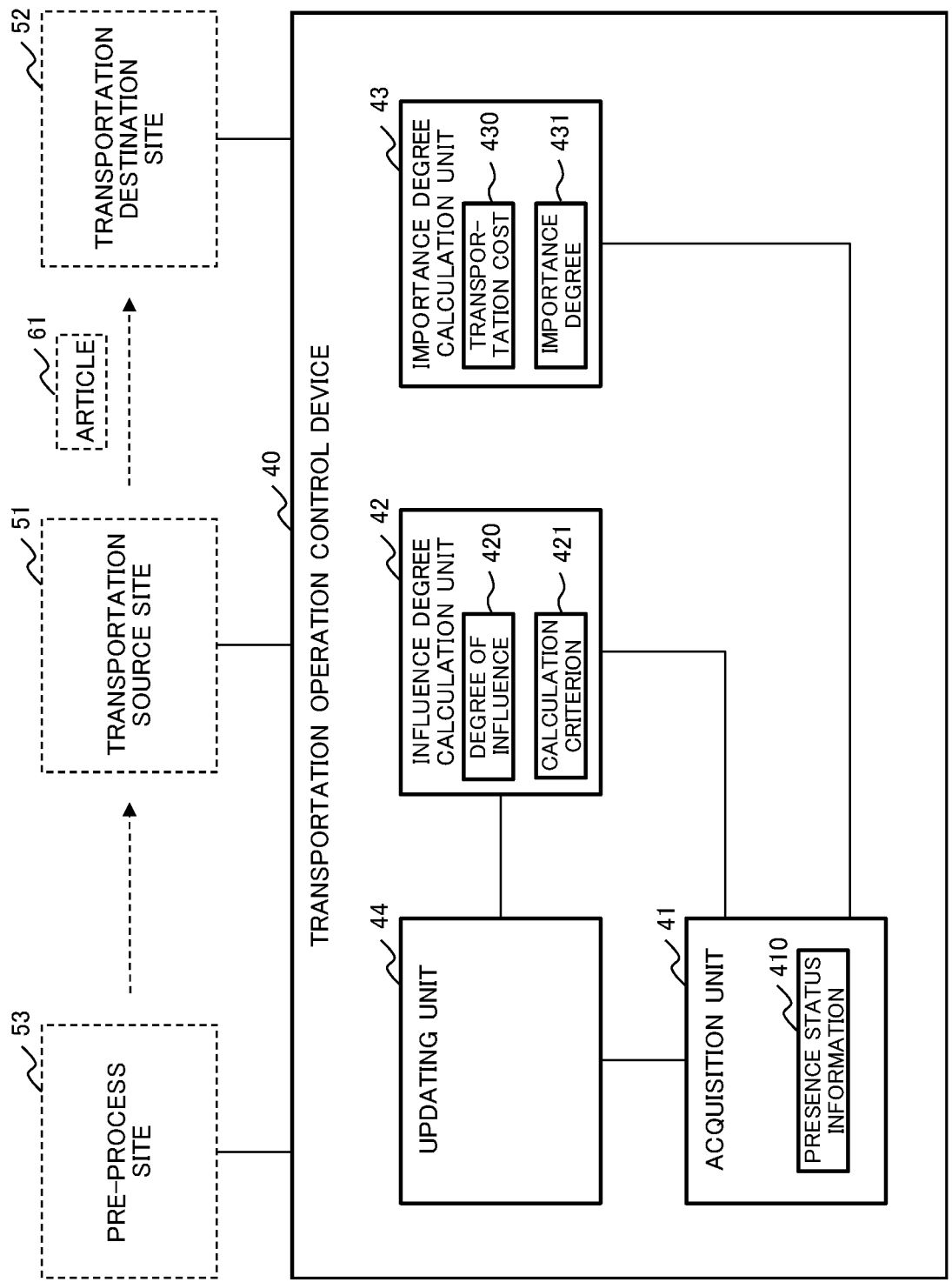
FIG. 11 is a block diagram illustrating a configuration of a transportation operation control device 40 according to a second example embodiment of the present invention.

FIG. 11 is a block diagram conceptually illustrating a configuration of a transportation operation control device 40 according to a second example embodiment of the present invention. The transportation operation control device 40 includes an acquisition unit 41, an influence degree calculation unit 42, an importance degree calculation unit 43, and an updating unit 44.

The acquisition unit 41 acquires presence status information 410 representing presence statuses of articles 61 at a plurality of sites.

The influence degree calculation unit 42 calculates, among the plurality of sites, based on presence status information 410 relating to a transportation source site 51 and a pre-process site 53 that influences a presence status of articles 61 at the transportation source site 51, the magnitude of a degree 420 of influence of the pre-process site 53 on the transportation source site 51, using a calculation criterion 421.

The importance degree calculation unit 43 calculates, among the plurality of sites, based on a transportation cost 430 required for a transportation operation of transporting an article 61 from the transportation source site 51 to a transportation destination site 52, presence status information 410 relating to the transportation source site 51 and the transportation destination site 52, and the magnitude of the degree 420 of influence, a degree 431 of importance of the transportation operation for a combination of the transportation source site 51 and the transportation destination site 52.

The updating unit 44 updates, based on presence status information 410 relating to the transportation source site 51 and the transportation destination site 52 after the transportation operation selected based on the degree 431 of importance has been performed, the calculation criterion 421.

The transportation operation control device 40 according to the present example embodiment is capable of, when, in a factory or the like, loads on operation processes and transportation capability for articles change, surely performing transportation control of the articles that avoids a reduction in processing efficiency in the entire factory caused by a downstream side (succeeding process side) process being influenced by fluctuations in an upstream side (pre-process side) process. The reason for the capability is that the transportation operation control device 40 calculates a importance degree of a transportation operation, based on the magnitude of a degree of influence of a site on the pre-process side on a site on the succeeding process side and, after a transportation operation selected based on the importance degree has been performed, also updates a calculation criterion of the degree of influence, based on presence statuses of articles at sites related to the transportation operation.

<Hardware Configuration Example>

In the above-described example embodiments, the constituent components of the transportation operation control devices illustrated in FIGS. 1 and 11 can be achieved using dedicated hardware (HW) (electronic circuits). In FIGS. 1 and 11, at least the following constituent components may be viewed as functional (processing) units (software modules) of a software program:

the acquisition units 11 and 41;
the influence degree calculation units 12 and 42;
the importance degree calculation units 13 and 43;
the updating units 14 and 44; and
the detection unit 15.

However, the division into the constituent components illustrated in the drawings is a configuration for the purpose of description, and various configurations are conceivable at the time of actual implementation. An example of a hardware environment in this case will be described with reference to FIG. 12.

Figure 12:
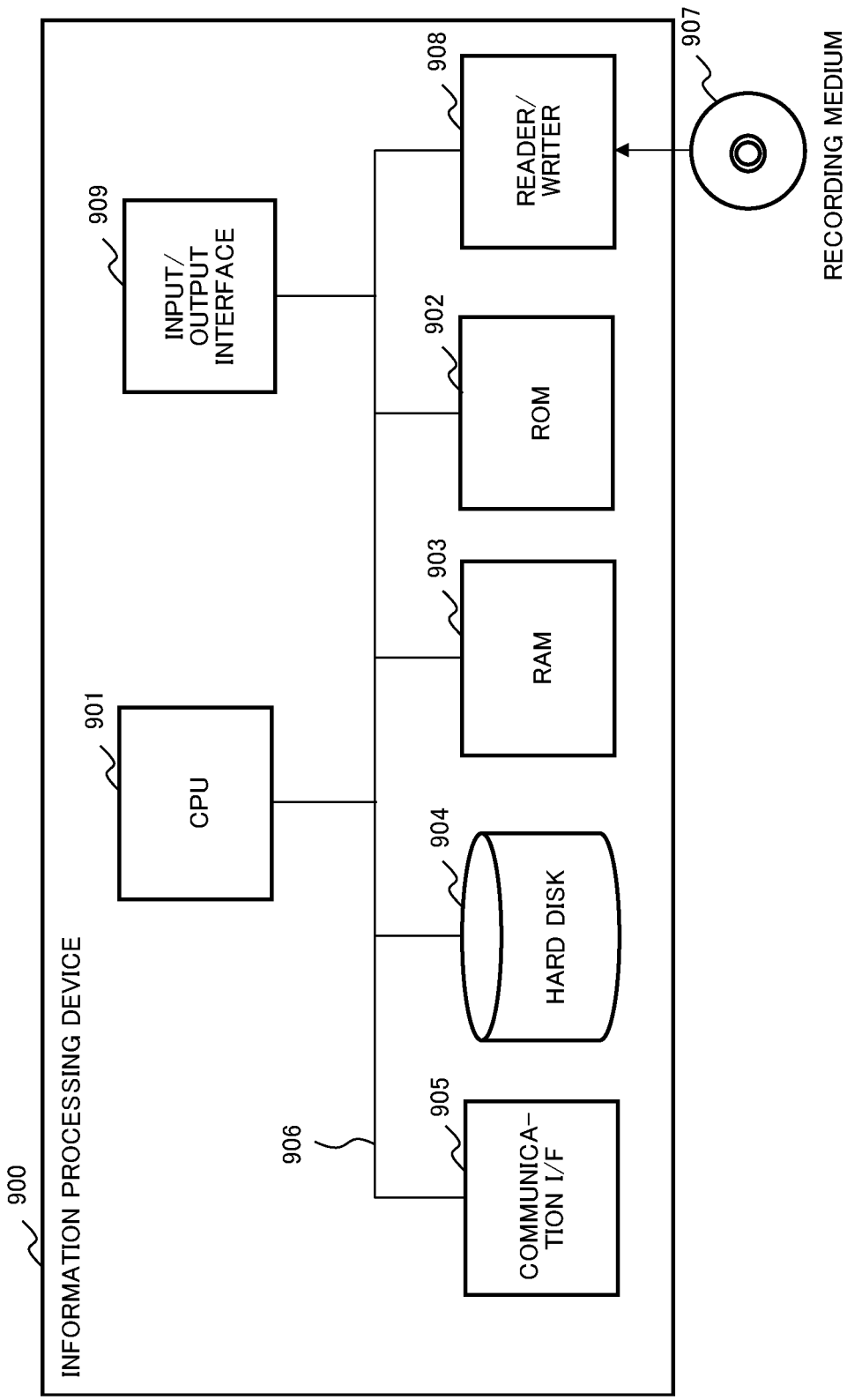
FIG. 12 is a block diagram illustrating a configuration of an information processing device 900 that is capable of executing the transportation operation control devices according to the example embodiments of the present invention.

FIG. 12 is a block diagram describing, in an exemplifying manner, a configuration of an information processing device 900 (computer) that is capable of executing a transportation operation control device according to the example embodiments of the present invention. That is, FIG. 12 illustrates a hardware environment that is a configuration of a computer (information processing device) capable of achieving the transportation operation control devices 10 and 40 illustrated in FIGS. 1 and 11, respectively, and is capable of achieving the functions in the above-described example embodiments.

The information processing device 900 illustrated in FIG. 12 includes the following components as constituent components:

a central processing unit (CPU) 901;
a read only memory (ROM) 902;
a random access memory (RAM) 903;
a hard disk (storage device) 904;
a communication interface 905 for communication with an external device;
a bus 906 (communication line);
a reader/writer 908 capable of reading and writing data stored in a recording medium 907, such as a compact disc read only memory (CD-ROM); and
an input/output interface 909.

That is, the information processing device 900 that includes the above-described constituent components is a general computer in which the components are interconnected via the bus 906. The information processing device 900 includes, in some cases, a plurality of CPUs 901 and, in other cases, a CPU 901 composed of multiple cores.

The present invention, which was described using the above-described example embodiments as examples, provides the information processing device 900 illustrated in FIG. 12 with a computer program that is capable of achieving the following functions. The functions are the above-described configurations in the block configuration diagrams (FIGS. 1 and 11) or the functions in the flowchart (FIG. 10), which were referred to in the descriptions of the example embodiments. The present invention is achieved by subsequently reading out the computer program into the CPU 901 in the hardware and interpreting and executing the computer program. The computer program provided into the device may only be stored in a readable/writable volatile memory (the RAM 903) or a non-volatile storage device, such as the ROM 902 and the hard disk 904.

In the case described afore, a method that is commonly used these days may be employed as a provision method of the computer program into the hardware. Example of such a method include a method of installing the computer program into the device via various recording media 907, such as a CD-ROM, and a method of downloading the computer program from the outside via a communication line, such as the Internet. In such a case, it may be viewed that the present invention is configured with codes composing such a computer program or the recording medium 907 in which the codes are stored.

The invention has been particularly shown and described with reference to example embodiments thereof. However, the invention is not limited to these example embodiments. That is, it will be understood by those of ordinary skill in the art that various changes in form and details may be made therein without departing from the spirit and scope of the present invention as defined by the claims.

All or part of the example embodiments described above may be described as in the following supplementary notes. However, the present invention described exemplarily using the above-described example embodiments is not limited to the following supplementary notes.

(Supplementary Note 1)

A transportation operation control device including:

an acquisition means for acquiring presence status information representing presence statuses of articles at a plurality of sites;

an influence degree calculation means for calculating a magnitude of a degree of influence of a pre-process site on a transportation source site, using a calculation criterion, based on the presence status information relating to the transportation source site and the pre-process site among the plurality of sites, the pre-process site influencing the presence status of articles at the transportation source site;

an importance degree calculation means for calculating a importance degree of the transportation operation for a combination of the transportation source site and the transportation destination site, based on a transportation cost required for a transportation operation of transporting the article from the transportation source site to a transportation destination site among the plurality of sites, the presence status information relating to the transportation source site and the transportation destination site, and the magnitude of the degrees of influence; and an updating means for updating the calculation criterion, based on the presence status information relating to the transportation source site and the transportation destination site after the transportation operation selected based on the importance degree has been performed.

(Supplementary Note 2)

The transportation operation control device according to supplementary note 1, in which the acquisition means acquires the presence status information that indicates a first amount, a second amount, a first usage rate, and a second usage rate, the first amount relating to the articles that are in a state of waiting for transportation at the pre-process site, the second amount relating to the articles that are in a state of waiting for processing at the transportation source site, the first usage rate indicating a ratio of the first amount to a maximum value of the amount of the articles that can be present in a state of waiting for transportation at the pre-process site, the second usage rate indicating a ratio of the second amount to a maximum value of the amount of the articles that can be present in a state of waiting for processing at the transportation source site.

(Supplementary Note 3)

The transportation operation control device according to supplementary note 2, in which the acquisition means acquires the presence status information that indicates the numbers or weights of the articles as the first amount and the second amount.

(Supplementary Note 4)

The transportation operation control device according to supplementary note 2 or 3, in which the larger the first amount is or the smaller the second amount is, the greater the influence degree calculation means calculates the degree of influence to be.

(Supplementary Note 5)

The transportation operation control device according to supplementary note 2 or 3, in which the larger the first usage rate is or the smaller the second usage rate is, the greater the influence degree calculation means calculates the degree of influence to be.

(Supplementary Note 6)

The transportation operation control device according to supplementary note 2 or 3, in which the larger a difference between the first amount and the second amount is, the larger a difference between the first usage rate and the second usage rate is, the larger a ratio of the first amount to the second amount is, or the larger a ratio of the first usage rate to the second usage rate is, the greater the influence degree calculation means calculates the degree of influence to be.

(Supplementary Note 7)

The transportation operation control device according to any one of supplementary notes 1 to 6, in which the acquisition means acquires the presence status information that indicates a third amount, a fourth amount, a third usage rate, and a fourth usage rate, the third amount relating to the articles that are in a state of waiting for transportation at the transportation source site, the fourth amount relating to the articles that are in a state of waiting for processing at the transportation destination site, the third usage rate indicating a ratio of the third amount to a maximum value of the amount of the articles that can be present in a state of waiting for transportation at the transportation source site, the fourth usage rate indicating a ratio of the fourth amount to a maximum value of the amount of the articles that can be present in a state of waiting for processing at the transportation destination site.

(Supplementary Note 8)

The transportation operation control device according to supplementary note 7, in which the acquisition means acquires the presence status information that indicates the numbers or weights of the articles as the third amount and the fourth amount.

(Supplementary Note 9)

The transportation operation control device according to supplementary note 7 or 8, in which the updating means updates the calculation criterion, based on a difference between the third amount and the fourth amount or a ratio of the third amount to the fourth amount after the transportation operation selected based on the importance degree has been performed.

(Supplementary Note 10)

The transportation operation control device according to supplementary note 7 or 8, in which the updating means updates the calculation criterion, based on a difference between the third usage rate and the fourth usage rate or a ratio of the third usage rate to the fourth usage rate after the transportation operation selected based on the importance degree has been performed.

(Supplementary Note 11)

The transportation operation control device according to supplementary note 7 or 8, in which the updating means updates the calculation criterion, based on a status after the transportation operation selected based on the importance degree has been performed, the status relating that a difference between the third amount and the fourth amount or a ratio of the third amount to the fourth amount has increased or decreased from the difference or the ratio before the transportation operation has been performed.

(Supplementary Note 12)

The transportation operation control device according to supplementary note 7 or 8, in which the updating means updates the calculation criterion, based on a status after the transportation operation selected based on the importance degree has been performed, the status relating that a difference between the third usage rate and the fourth usage rate or a ratio of the third usage rate to the fourth usage rate has increased or decreased from the difference or the ratio before the transportation operation has been performed.

(Supplementary Note 13)

The transportation operation control device according to any one of supplementary notes 1 to 12, in which the updating means updates the calculation criterion, based on an index relating to the number of times that the transportation operation for the combination has been performed during a predetermined period.

(Supplementary Note 14)

The transportation operation control device according to any one of supplementary notes 1 to 13, in which the updating means updates a value included in the calculation criterion, based on predetermined information representing configurations of the plurality of sites.

(Supplementary Note 15)

The transportation operation control device according to any one of supplementary notes 1 to 13, in which the updating means updates a value included in the calculation criterion, based on current presence status information relating to the plurality of sites or a change over time of the presence status information relating to the plurality of sites.

(Supplementary Note 16)

The transportation operation control device according to any one of supplementary notes 1 to 15 further including a detection means for detecting that the transportation operation has been completed, in which the updating means updates the calculation criterion when the detection means detects completion of the transportation operation, when a predetermined period has elapsed since the detection means detected completion of the transportation operation, when it is a regular timing, or when information indicating that an environment relating to the transportation operation has changed is obtained.

(Supplementary Note 17)

The transportation operation control device according to any one of supplementary notes 1 to 16, in which the importance degree calculation means uses a transportation cost based on a cost required for a transportation resource performing the transportation operation to move, among the plurality of sites, from a site at which the transportation resource was last positioned before the transportation source site to the transportation source site or a cost required for the transportation resource to transport the article from the transportation source site to the transportation destination site.

(Supplementary Note 18)

The transportation operation control device according to any one of supplementary notes 1 to 17, in which the pre-process sites include, among the plurality of sites, a site positioned two or more processes on a pre-process side with respect to the transportation source site.

(Supplementary Note 19)

A transportation operation control system including:

the transportation operation control device according to any one of supplementary notes 1 to 18; and the transportation resource that performs a transportation operation.

(Supplementary Note 20)

The transportation operation control system according to supplementary note 19, in which the importance degree calculation means transmits information to the transportation resource, the information indicating the transportation operation for the combination whose importance degree is the highest, and the transportation resource next performs the transportation operation for the combination indicated by the information received from the importance degree calculation means.

(Supplementary Note 21)

The transportation operation control system according to supplementary note 19 or 20, in which the transportation resource is a transportation device that transports the article or a terminal device that presents information indicating the transportation operation to an operator who transports the article.

(Supplementary Note 22)

A transportation operation control method including an information processing device performing:
- acquiring presence status information representing presence statuses of articles at a plurality of sites;
- calculating a magnitude of a degree of influence of a pre-process site on a transportation source site, using a calculation criterion, based on the presence status information relating to the transportation source site and the pre-process site among the plurality of sites, the pre-process site influencing the presence status of articles at the transportation source site;
- calculating a importance degree of the transportation operation for a combination of the transportation source site and the transportation destination site, based on a transportation cost required for a transportation operation of transporting the article from the transportation source site to a transportation destination site among the plurality of sites, the presence status information relating to the transportation source site and the transportation destination site, and the magnitude of the degrees of influence; and
- updating the calculation criterion, based on the presence status information relating to the transportation source site and the transportation destination site after the transportation operation selected based on the importance degree has been performed.

(Supplementary Note 23)

A recording medium in which a transportation operation control program is stored, the program causing a computer to execute:
- acquisition processing of acquiring presence status information representing presence statuses of articles at a plurality of sites;
- influence degree calculation processing of calculating a magnitude of a degree of influence of a pre-process site on a transportation source site, using a calculation criterion, based on the presence status information relating to the transportation source site and the pre-process site among the plurality of sites, the pre-process site influencing the presence status of articles at the transportation source site;
- importance degree calculation processing of calculating a importance degree of the transportation operation for a combination of the transportation source site and the transportation destination site, based on a transportation cost required for a transportation operation of transporting the article from the transportation source site to a transportation destination site among the plurality of sites, the presence status information relating to the transportation source site and the transportation destination site, and the magnitude of the degrees of influence; and
- updating processing of updating the calculation criterion, based on the presence status information relating to the transportation source site and the transportation destination site after the transportation operation selected based on the importance degree has been performed

REFERENCE SIGNS LIST

1 Transportation operation control system
10 Transportation operation control device
11 Acquisition unit
12 Influence degree calculation unit
13 Importance degree calculation unit
14 Updating unit
15 Detection unit
16 Storage unit
161 WS link management table
162 Transportation cost identifier management table
163 Transportation cost management table
164 Calculation criterion management table
165 Buffer management table
166 Importance degree management table
21 Transportation source WS
211 Input buffer
212 Processing unit
213 Output buffer
22 Transportation destination WS
221 Input buffer
222 Processing unit
223 Output buffer
23 Upstream WS
231 Input buffer
232 Processing unit
233 Output buffer
30 Transportation resource
31 Article
40 Transportation operation control device
41 Acquisition unit
410 Presence status information
42 Influence degree calculation unit
420 Degree of influence
421 Calculation criterion
43 Importance degree calculation unit
430 Transportation cost
431 Importance degree
51 Transportation source site
52 Transportation destination site
53 Pre-process site
61 Article
900 Information processing device
901 CPU
902 ROM
903 RAM
904 Hard disk (storage device)
905 Communication interface
906 Bus
907 Recording medium
908 Reader/writer
909 Input/output interface

What is claimed is:

1. A transportation operation control system comprising:
a transportation resource configured to transport a plurality of articles; and
a transportation operation control device including:
at least one memory storing a computer program; and
at least one processor configured to execute the computer program to:
calculate a magnitude of a degree of influence of a pre-process site on a transportation source site, among a plurality of sites, using a calculation criterion, based on presence status information relating to the transportation source site and the pre-process site, among a plurality of presence status information representing presence status of the plurality of articles at the plurality of sites, the pre-process site influencing the presence status of articles at the transportation source site;

calculate an importance degree of the transportation operation for a combination of the transportation source site and the transportation destination site, based on a transportation cost required for a transportation operation of transporting the article from the transportation source site to a transportation destination site among the plurality of sites, the presence status information relating to the transportation source site and the transportation destination site, and the magnitude of the degrees of influence;

update the calculation criterion, based on the presence status information relating to the transportation source site and the transportation destination site after the transportation operation selected based on the importance degree has been performed; and control the transportation resource in accordance with the calculated importance degree.

2. The transportation operation control system according to claim 1, wherein
the presence status information indicates a first amount, a second amount, a first usage rate, and a second usage rate, the first amount relating to the articles that are in a state of waiting for transportation at the pre-process site, the second amount relating to the articles that are in a state of waiting for processing at the transportation source site, the first usage rate indicating a ratio of the first amount to a maximum value of the amount of the articles that can be present in a state of waiting for transportation at the pre-process site, the second usage rate indicating a ratio of the second amount to a maximum value of the amount of the articles that can be present in a state of waiting for processing at the transportation source site.

3. The transportation operation control system according to claim 2, wherein
the presence status information indicates the numbers or weights of the articles as the first amount and the second amount.

4. The transportation operation control system according to claim 2, wherein the processor is configured to execute the computer program to
calculate the degree of influence such that the larger the first amount is or the smaller the second amount is, the greater the degree of influence becomes.

5. The transportation operation control system according to claim 2, wherein the processor is configured to execute the computer program to
calculate the degree of influence such that the larger the first usage rate is or the smaller the second usage rate is, the greater the degree of influence becomes.

6. The transportation operation control system according to claim 2, wherein the processor is configured to execute the computer program to
calculate the degree of influence such that the larger a difference between the first amount and the second amount is, the larger a difference between the first usage rate and the second usage rate is, the larger a ratio of the first amount to the second amount is, or the larger a ratio of the first usage rate to the second usage rate is, the greater the degree of influence becomes.

7. The transportation operation control system according to claim 1, wherein
the presence status information indicates a third amount, a fourth amount, a third usage rate, and a fourth usage rate, the third amount relating to the articles that are in a state of waiting for transportation at the transportation source site, the fourth amount relating to the articles that are in a state of waiting for processing at the transportation destination site, the third usage rate indicating a ratio of the third amount to a maximum value of the amount of the articles that can be present in a state of waiting for transportation at the transportation source site, the fourth usage rate indicating a ratio of the fourth amount to a maximum value of the amount of the articles that can be present in a state of waiting for processing at the transportation destination site.

8. The transportation operation control system according to claim 7, wherein
the presence status information indicates the numbers or weights of the articles as the third amount and the fourth amount.

9. The transportation operation control system according to claim 7, wherein the processor is configured to execute the computer program to
update the calculation criterion, based on a difference between the third amount and the fourth amount or a ratio of the third amount to the fourth amount after the transportation operation selected based on the importance degree has been performed.

10. The transportation operation control system according to claim 7, wherein the processor is configured to execute the computer program to
update the calculation criterion, based on a difference between the third usage rate and the fourth usage rate or a ratio of the third usage rate to the fourth usage rate after the transportation operation selected based on the importance degree has been performed.

11. The transportation operation control system according to claim 7, wherein the processor is configured to execute the computer program to
update the calculation criterion, based on a status after the transportation operation selected based on the importance degree has been performed, the status relating that a difference between the third amount and the fourth amount or a ratio of the third amount to the fourth amount has increased or decreased from the difference or the ratio before the transportation operation has been performed.

12. The transportation operation control system according to claim 7, wherein the processor is configured to execute the computer program to
update the calculation criterion, based on a status after the transportation operation selected based on the importance degree has been performed, the status relating that a difference between the third usage rate and the fourth usage rate or a ratio of the third usage rate to the fourth usage rate has increased or decreased from the difference or the ratio before the transportation operation has been performed.

13. The transportation operation control system according to claim 1, wherein the processor is configured to execute the computer program to
update the calculation criterion, based on an index relating to the number of times that the transportation operation for the combination has been performed during a predetermined period.

14. The transportation operation control system according to claim 1, wherein the processor is configured to execute the computer program to
update a value included in the calculation criterion, based on predetermined information representing configurations of the plurality of sites.

15. The transportation operation control system according to claim 1, wherein the processor is configured to execute the computer program to
update a value included in the calculation criterion, based on current presence status information relating to the plurality of sites or a change over time of the presence status information relating to the plurality of sites.

16. The transportation operation control system according to claim 1, wherein the processor is configured to execute the computer program to:
detect that the transportation operation has been completed; and
update the calculation criterion when completion of the transportation operation is detected, when a predetermined period has elapsed since completion of the transportation operation was detected, when it is a regular timing, or when information indicating that an environment relating to the transportation operation has changed is obtained.

17. The transportation operation control device system according to claim 1, wherein the processor is configured to execute the computer program to
use a transportation cost based on a cost required for a transportation resource performing the transportation operation to move, among the plurality of sites, from a site at which the transportation resource was last positioned before the transportation source site to the transportation source site or a cost required for the transportation resource to transport the article from the transportation source site to the transportation destination site.

18. The transportation operation control system according to claim 1, wherein
the pre-process sites include, among the plurality of sites, a site positioned two or more processes on a pre-process side with respect to the transportation source site.

19. A transportation operation control method performed by an information processing device, which communicates with a transportation resource configured to transport a plurality of articles, the method comprising:
performing:
calculating a magnitude of a degree of influence of a pre-process site on a transportation source site, using a calculation criterion, based on presence status information relating to the transportation source site among a plurality of sites and the pre-process site among the presence status information representing presence status of articles at the plurality of sites, the pre-process site influencing the presence status of articles at the transportation source site;
calculating an importance degree of the transportation operation for a combination of the transportation source site and the transportation destination site, based on a transportation cost required for a transportation operation of transporting the article from the transportation source site to a transportation destination site among the plurality of sites, the presence status information relating to the transportation source site and the transportation destination site, and the magnitude of the degrees of influence;
updating the calculation criterion, based on the presence status information relating to the transportation source site and the transportation destination site after the transportation operation selected based on the importance degree has been performed; and
controlling the transportation resource in accordance with the calculated importance degree.

20. A non-transitory computer-readable recording medium in which a transportation operation control program is stored, the program causing a computer, which communicates with a transportation resource configured to transport a plurality of articles, to execute:
calculating a magnitude of a degree of influence of a pre-process site on a transportation source site, using a calculation criterion, based on presence status information relating to the transportation source site among a plurality of sites and the pre-process site among the presence status information representing presence status of articles at the plurality of sites, the pre-process site influencing the presence status of articles at the transportation source site;
calculating an importance degree of the transportation operation for a combination of the transportation source site and the transportation destination site, based on a transportation cost required for a transportation operation of transporting the article from the transportation source site to a transportation destination site among the plurality of sites, the presence status information relating to the transportation source site and the transportation destination site, and the magnitude of the degrees of influence;
updating the calculation criterion, based on the presence status information relating to the transportation source site and the transportation destination site after the transportation operation selected based on the importance degree has been performed; and
controlling the transportation resource in accordance with the calculated importance degree.

* * * * *